(12) United States Patent
Vera-Castaneda

(10) Patent No.: US 10,543,453 B2
(45) Date of Patent: Jan. 28, 2020

(54) REMOVAL OF SULFATE FROM SOLVENT SOLUTIONS USING AN ANION EXCHANGE RESIN

(71) Applicant: MECS, INC., Chesterfield, MO (US)

(72) Inventor: Ernesto Vera-Castaneda, Chesterfield, MO (US)

(73) Assignee: MECS, Inc., Chesterfield, MO (US)

( * ) Notice: Subject to any disclaimer, the term of this patent is extended or adjusted under 35 U.S.C. 154(b) by 0 days.

(21) Appl. No.: 16/092,103

(22) PCT Filed: Apr. 18, 2017

(86) PCT No.: PCT/US2017/028123
§ 371 (c)(1),
(2) Date: Oct. 8, 2018

(87) PCT Pub. No.: WO2017/184591
PCT Pub. Date: Oct. 26, 2017

(65) Prior Publication Data
US 2019/0111381 A1    Apr. 18, 2019

Related U.S. Application Data

(60) Provisional application No. 62/324,088, filed on Apr. 18, 2016.

(51) Int. Cl.
*B01D 53/14* (2006.01)
*B01J 41/07* (2017.01)
(Continued)

(52) U.S. Cl.
CPC ..... *B01D 53/1481* (2013.01); *B01D 53/1425* (2013.01); *B01J 41/07* (2017.01);
(Continued)

(58) Field of Classification Search
CPC ............ B01D 53/1425; B01D 53/1437; B01D 53/145; B01D 53/1481; B01D 53/50; B01D 53/507; B01D 53/78; B01D 2252/205; B01D 2253/206; B01D 2257/302; B01D 2257/70; B01D 2258/0283; B01J 10/00;
(Continued)

(56) References Cited

U.S. PATENT DOCUMENTS 3,928,548 A * 12/1975 Deschamps ........ B01D 53/1418
423/575
4,122,149 A * 10/1978 Dunnery ............... B01D 53/501
423/242.7
(Continued)

FOREIGN PATENT DOCUMENTS

CN         103249465 A * 8/2013 ......... B01D 53/1425

*Primary Examiner* — Timothy C Vanoy
(74) *Attorney, Agent, or Firm* — Stinson LLP

(57) ABSTRACT

Generally, the present invention relates to the selective removal of divalent sulfur oxyanions (e.g., sulfate) from an aqueous solvent using an anion exchange resin. More particularly, this invention relates to regenerative processes for the selective removal and recovery of sulfur dioxide from a source gas using an aqueous absorption medium in which an anion exchange resin is used to selectively remove divalent sulfur oxyanion impurities accumulating in the recirculating aqueous absorption medium.

26 Claims, 10 Drawing Sheets

(51) Int. Cl.
*B01J 41/13* (2017.01)
*B01J 49/07* (2017.01)
*B01J 49/57* (2017.01)

(52) U.S. Cl.
CPC ............... *B01J 41/13* (2017.01); *B01J 49/07* (2017.01); *B01J 49/57* (2017.01); B01D 2252/205 (2013.01); B01D 2258/0283 (2013.01)

(58) Field of Classification Search
CPC ... B01J 16/00; B01J 39/00; B01J 39/02; B01J 47/00; B01J 47/016; B01J 49/00
See application file for complete search history.

(56) References Cited

U.S. PATENT DOCUMENTS

| | | | | |
|---|---|---|---|---|
| 4,222,993 | A * | 9/1980 | Holter | B01D 53/1456 423/166 |
| 5,108,723 | A * | 4/1992 | Chang | B01D 53/1493 423/242.7 |
| 6,197,997 | B1 * | 3/2001 | Carey | B01J 39/00 562/406 |
| 9,266,059 | B2 * | 2/2016 | Vera-Castaneda | B01D 53/1406 |
| 2012/0107209 | A1 * | 5/2012 | Vera-Castaneda | B01D 53/1425 423/242.2 |
| 2018/0043302 | A1 * | 2/2018 | Wei | B01D 53/50 |

\* cited by examiner

REMOVAL OF SULFATE FROM SOLVENT SOLUTIONS USING AN ANION EXCHANGE RESIN

FIELD OF THE INVENTION

Generally, the present invention relates to the selective removal of divalent sulfur oxyanions (e.g., sulfate) from an aqueous solution containing the divalent sulfur oxyanions and the salt of a polyprotic carboxylic acid using an anion exchange resin. More particularly, this invention relates to regenerative processes for the selective removal and recovery of sulfur dioxide from a source gas using an aqueous absorption medium comprising a polyprotic carboxylic acid salt absorbent in which an anion exchange resin is used to selectively remove divalent sulfur oxyanion impurities accumulating in the recirculating aqueous absorption medium.

BACKGROUND OF THE INVENTION

Gaseous effluents containing contaminant gases are produced by a variety of operations. For example, sulfur dioxide is generated in various chemical and metallurgical operations, including sulfur-burning sulfuric acid processes, spent sulfuric acid plants, roasting or smelting of sulfidic metal ores and concentrates and the combustion of sulfur-containing fuels (e.g., flue gases from coal-fired power plants). Carbon fuels play a significant role in the generation of electricity, providing energy for heating and fuels for transportation. Most carbon fuels contain sulfur that when burned turns into sulfur dioxide. The sulfur dioxide emitted contributes to a wide range of environmental and health problems. As the emerging economies expand, their demands for energy rapidly increase and as lower sulfur content carbon fuels are depleted, more and more oil and coal reserves having increasingly higher levels of sulfur will be utilized leading to increased sulfur dioxide emissions.

There are also increasing regulatory pressures to reduce sulfur dioxide emissions around the world. The most commonly used method to remove sulfur dioxide is through absorption or adsorption techniques. One approach is to contact sulfur dioxide with an aqueous stream containing an inexpensive base. The sulfur dioxide dissolves in water, forming sulfurous acid ($H_2SO_3$) that in turn reacts with the base to form a salt. Common bases are sodium hydroxide, sodium carbonate, and lime (calcium hydroxide, $Ca(OH)_2$). The pH starts at about 9 and is lowered to about 6 after the reaction with sulfur dioxide. A one stage wet scrubbing system usually removes over 95% of the sulfur dioxide. Wet scrubbers and similar dry scrubbing approaches require a capital investment, variable costs due to lime consumption and solids disposal in addition to the energy consumption and utility consumption used to operate the sulfur dioxide removal system.

Another approach is to enhance the sulfur dioxide strength of gaseous effluents in a regenerative process by selectively absorbing the sulfur dioxide in a suitable solvent and subsequently stripping the absorbed sulfur dioxide to produce regenerated solvent and a gas enriched in sulfur dioxide content. A variety of aqueous and organic solvents have been used in regenerative sulfur dioxide absorption/desorption processes. For example, aqueous solutions of alkali metals (e.g., sodium sulfite/bisulfite solution), amines (e.g., alkanolamines, tetrahydroxyethylalkylenediamines, etc.), amine salts, and salts of various organic acids have been used as regenerable sulfur dioxide absorbents. Organic solvents used in sulfur dioxide absorption/desorption processes include dimethyl aniline, tetraethylene glycol dimethyl ether, and dibutyl butyl phosphonate. The capacity of aqueous and organic solvents is diminished by lower pressures and higher temperatures. Accordingly, the sulfur dioxide gas is recovered (and the solvent regenerated) by lowering the pressure and/or increasing the temperature.

U.S. Pat. No. 8,940,258 and US 2012/0107209 A1, describe regenerative sulfur dioxide recovery processes that utilize a buffered aqueous absorption solution comprising certain weak inorganic or organic acids or salts thereof, preferably certain polyprotic carboxylic acids or salts thereof, to selectively absorb sulfur dioxide from effluent gases. The absorbed sulfur dioxide is subsequently stripped to regenerate the absorption solution and produce a gas enriched in sulfur dioxide content.

In these and other regenerative sulfur dioxide recovery processes, there is the potential for accumulation of contaminants in the absorption solution that may interfere with the absorption/stripping operations. These contaminants include divalent sulfur oxyanions, predominantly sulfate salts along with other sulfur-containing species such as thiosulfates and thionates as well as acid gases absorbed from the effluent gas to be treated. The sulfur dioxide-containing effluent gas often contains some sulfur trioxide as well as sulfuric acid mist. In addition, liquid phase oxidation of bisulfite in the absorber leads to the formation of bisulfate. Oxidation tends to be highly temperature dependent and increases sharply as the temperature in the absorber increases. The oxidation process may be catalyzed by the presence of nitric oxide which is often present in the gas to be treated. Iron, sodium, or other metal contamination of the absorption solution may act as an oxidation catalyst and also increase the rate of oxidation of absorbed sulfur dioxide. The addition of a base (e.g., NaOH) restores the buffer capacity of the absorption solution by neutralizing the bisulfate and forming sulfate salts (e.g., $Na_2SO_4$) that will accumulate in the recirculating absorption solution and potentially undermine efficient removal and recovery of sulfur dioxide.

As disclosed in U.S. Pat. No. 8,940,258 and US 2012/0107209 A1, sulfate salt contaminant levels in the aqueous absorption solution may be controlled at an acceptable level by periodically diverting at least a portion (e.g., a slip stream) of the absorption solution for treatment to remove sulfate. Treatment comprises evaporating water from the slip stream (e.g., by heating and/or reducing the pressure to flash evaporate water) to produce a concentrated solution supersaturated in the sulfate salt. Sulfate salt crystals are then precipitated from the concentrated aqueous absorption solution in a crystallizer to form a crystallization slurry comprising precipitated sulfate salt crystals and a mother liquor. These publications also describe the addition of an oxidation inhibitor to the absorption solution to reduce oxidation of bisulfite and sulfite to sulfate contaminants.

U.S. Pat. No. 4,122,149 discloses processes for the selective removal of sulfur dioxide from gases using an aqueous absorbent solution. Sulfate and other sulfur oxyanions of heat stable salts that accumulate in the recirculating absorbent solution are removed by contacting it with an anion exchange resin (e.g., a weak base anion exchange resin). Prior to contacting the absorbent solution, the anion exchange resin is converted to the bisulfite form by contact with sulfurous acid. During contact with the absorbent solution, the bisulfite anions are displaced by the heat stable sulfur oxyanions which are thus taken out of the solution. The anion exchange resin is regenerated by contacting it with aqueous ammonium hydroxide to replace the heat stable sulfur oxyanions on the charged resin with hydroxyl anions and thereafter contacting the resin with sulfurous acid to again convert the anion exchange resin to the bisulfite form.

Although the sulfate removal techniques described in U.S. Pat. No. 8,940,258 and US 2012/0107209 A1 can be effective, crystallizer operations, the handling of solids and loss of metal ion from the absorption solution adds to the cost and complexity of the system. Further, the use of anion exchange resins as taught in U.S. Pat. No. 4,122,149, is not applicable to all aqueous absorbent solutions, including those utilizing a polyprotic carboxylic acid salt absorbent, which compete for binding sites on the anion exchange resin and leads to absorbent losses.

A need persists for alternative methods of controlling sulfate contaminants at an acceptable level with minimal capital, energy and operating costs and without significant absorbent loss or complex process steps that would undermine the economic feasibility of the process.

SUMMARY OF THE INVENTION

The present invention is directed to novel regenerative processes for the selective removal and recovery of sulfur dioxide from a source gas in which the concentration of sulfate salts and other divalent sulfur oxyanion impurities in the aqueous absorption medium is effectively controlled by use of an anion exchange resin to remove the impurities. The sulfur dioxide absorption medium comprises a buffered solution of a salt of a relatively weak polyprotic carboxylic acid. In accordance with the present invention, it has been discovered that the selectivity of the anion exchange resin for preferentially binding sulfur oxyanion impurities without significant loss of the polyprotic carboxylic acid salt absorbent can be attained by acidifying the feed stream to the anion exchange resin by addition of an acidifying agent prior to contacting the anion exchange resin in order to convert at least a portion of the polyprotic carboxylic acid salt absorbent therein to the corresponding acid. Advantageously, this allows for efficient removal of the divalent sulfur oxyanion impurities while minimizing losses of the polyprotic carboxylic acid salt absorbent. In these and other embodiments, sulfurous acid and/or sulfur dioxide obtained from sulfur dioxide stripping or other operations elsewhere in the process are used as the acidifying agent. The anion exchange resin charged with impurities can be suitably regenerated for further use and disposal of the collected impurities.

Briefly, therefore, the present invention is directed to a process for selectively removing and recovering sulfur dioxide from a sulfur dioxide-containing source gas. A feed gas stream comprising the source gas is contacted in a sulfur dioxide absorber with a buffered aqueous absorption medium comprising a salt of a polyprotic carboxylic acid, thereby absorbing sulfur dioxide from the feed gas stream into the absorption medium and producing an exhaust gas from which sulfur dioxide has been removed and a sulfur dioxide-enriched absorption liquor comprising aqueous absorption medium and sulfur dioxide absorbed therein. The sulfur dioxide-enriched absorption liquor is heated in an absorption liquor stripper to desorb sulfur dioxide from the sulfur dioxide-enriched absorption liquor and thereby produce a regenerated aqueous absorption medium and a sulfur dioxide-enriched stripper gas. Regenerated aqueous absorption medium is recirculated to the sulfur dioxide absorber for further absorption of sulfur dioxide from further flow of the feed gas stream. In order to control the concentration of divalent sulfur oxyanion impurities as they accumulate in the aqueous absorption medium, an anion exchange feed stream comprising at least a portion of the aqueous absorption medium is contacted with an anion exchange resin. The anion exchange feed stream is acidified prior to contact with the anion exchange resin to convert at least a portion of the polyprotic carboxylic acid salt therein to the corresponding acid. Contact with the anion exchange resin selectively removes divalent sulfur oxyanion impurities from the anion exchange feed stream and produces a treated aqueous absorption medium from which impurities have been removed and an anion exchange resin charged with impurities.

In these and other embodiments of the present invention, the sulfur dioxide-enriched stripper gas withdrawn from the absorption liquor stripper constitutes a primary stripper gas effluent from which water is condensed by indirect transfer of heat to a cooling medium in a primary stripper gas cooler/condenser to thereby produce an aqueous sulfur dioxide-bearing condensate and a sulfur dioxide-containing vent gas. The anion exchange feed stream comprising at least a portion of the sulfur dioxide-enriched absorption liquor removed from the sulfur dioxide absorber is suitably acidified as needed with sulfurous acid and/or sulfur dioxide obtained from the aqueous sulfur dioxide-bearing condensate and/or the sulfur dioxide-containing vent gas prior to contacting acidified anion exchange feed stream with an anion exchange resin.

Other objects and features will be in part apparent and in part pointed out hereinafter.

DESCRIPTION OF THE PREFERRED EMBODIMENTS

Figure 1:
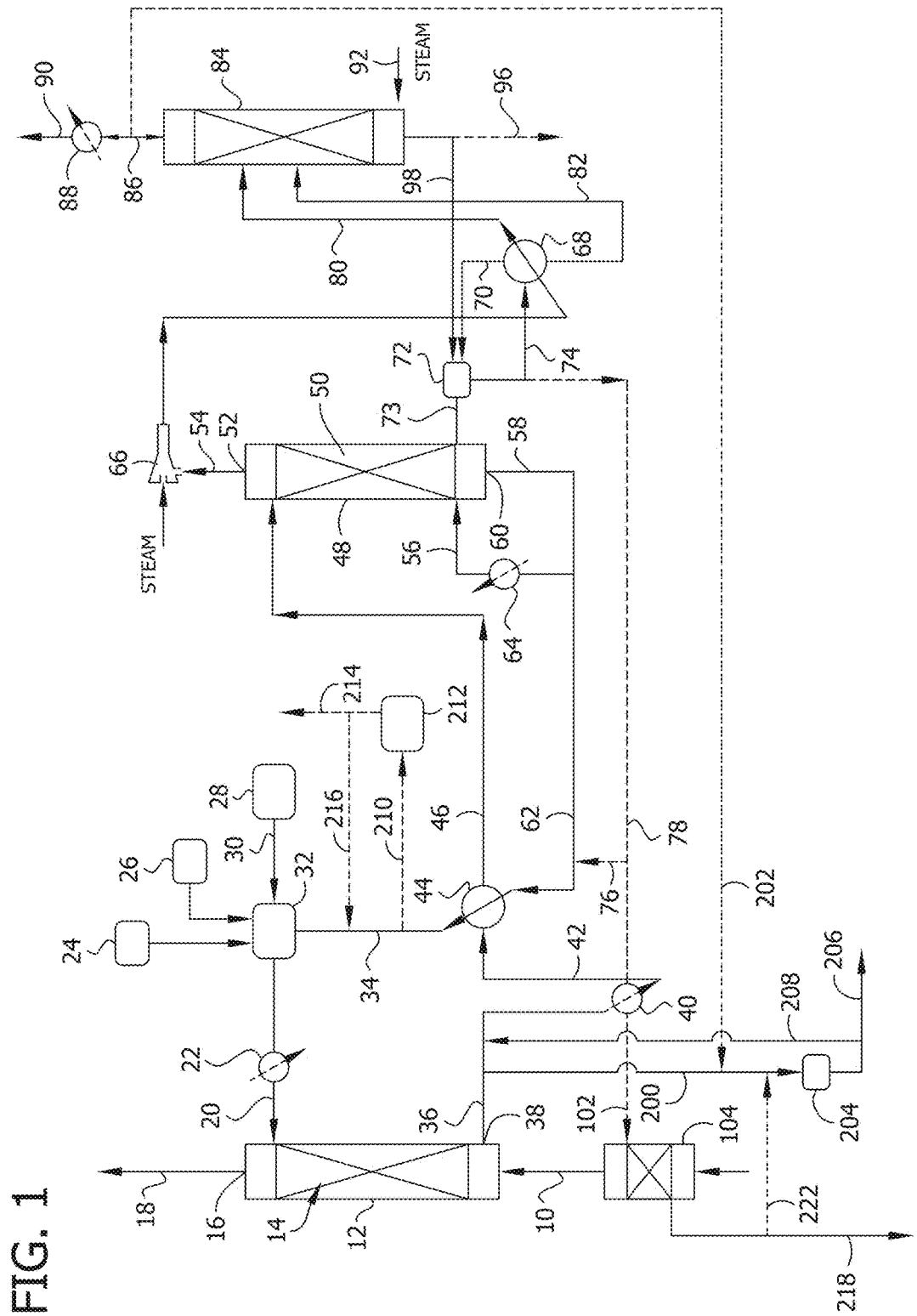
FIG. 1 is schematic flow sheet of absorption/desorption processes for selectively removing and recovering sulfur dioxide from a sulfur dioxide-containing source gas in which an anion exchange resin is employed for the removal of divalent sulfur oxyanions from the recirculating aqueous absorption medium and a cation exchange resin is optionally employed for removal of metal impurities from the recirculating aqueous absorption medium.

Improved regenerative processes for the recovery of sulfur dioxide from effluent gases utilizing a buffered aqueous absorption medium comprising a salt of a relatively weak polyprotic carboxylic acid have been devised. Polyprotic carboxylic acid salt absorbents and their use in the recovery of sulfur dioxide are described in the aforementioned US 2012/0107209 A1, the entire contents of which are expressly incorporated herein by reference. Although polyprotic carboxylic acid salt absorbents have proven to be effective in the selective recovery of sulfur dioxide from effluent gases with reduced overall energy and materials requirements, these systems are nevertheless subject to the build-up of sulfate and other divalent sulfur oxyanion impurities that undermine their effectiveness.

The present invention provides a unique solution for controlling the concentration of such impurities by selective removal using an anion exchange resin without significant loss of the polyprotic carboxylic acid salt absorbent. As described in detail below, anion exchange resin treatment is conducted in a manner that allows for the preferential adsorption of sulfur oxyanion impurities without significant loss of the polyprotic carboxylic acid salt absorbent. The processes described herein provide for effective removal of sulfate impurities and retention of sulfur dioxide removal efficiency while minimizing operation costs and capital investment.

A prominent application of the processes of the invention is in the process of recovery of sulfur dioxide from various chemical and metallurgical effluent gases, as mentioned above. However, the improvements described herein are also applicable to effluent gasses comprising other acid gases such as, e.g., $H_2S$, CO, $NO_x$, or HCl in addition to sulfur dioxide. The processes of the invention are suited for the recovery of sulfur dioxide from the tail gas of a contact sulfuric acid plant and other operations that generate relatively weak sulfur dioxide-containing effluents. However, it is also applicable to other process operations that require sulfur dioxide recovery, including operations that generate relatively rich sulfur dioxide gas streams (e.g., from about 2 to about 4 vol. % sulfur dioxide, greater than 10 vol. %, greater than 20 vol. %, or higher).

As described in detail in US 2012/0107209 A1, suitable polyprotic carboxylic acids for use in the buffered aqueous sulfur dioxide absorption medium include polyprotic carboxylic acids able to undergo a plurality of dissociations each having a pKa value, wherein at least one of the pKa values is from about 3 to about 10 at 25° C., preferably from about 4 to about 7 at 25° C. Non-limiting examples of polyprotic carboxylic acids include malic acid, citric acid, tartaric acid, phthalic acid, teraphthalic acid, succinic acid, glutaric acid, nitrilotriacetic acid, ethylenediaminetetraacetic acid, nicotinic acid (niacin), levulinic acid and mixtures thereof, preferably, citric acid, tartaric acid, malic acid and mixtures thereof, more preferably malic acid. Malic acid has a first pKa of about 3.4 and a second pKa of about 5.11 at 25° C. As described in greater detail below, salts can be formed in the buffered aqueous absorption solution by the reaction of a metal base (e.g., sodium hydroxide, potassium hydroxide, etc.) introduced into the absorption solution in quantities sufficient to neutralize at least some of the acid groups and form the polyprotic carboxylic acid salt absorbent (e.g., sodium bimalate and/or sodium malate).

One specific embodiment of a process of the present invention is illustrated in FIG. 1. FIG. 1 is schematic flow sheet of a regenerative absorption/desorption process for selective recovery of sulfur dioxide from a sulfur dioxide-containing source gas and is similar to a flow scheme illustrated and described in FIG. 1 of the above-mentioned U.S. Pat. No. 8,940,258. The illustrated process includes features that enhance energy efficiency by recovery of energy from the wet sulfur dioxide-enriched gas stream produced in the desorption stage. Although described in this context, it is to be understood that the processes of the present invention in which an anion exchange resin is employed for the removal of divalent sulfur oxyanions from the recirculating aqueous absorption medium are not limited to such specific manners of operation and are broadly applicable to regenerative sulfur dioxide recovery processes employing a buffered aqueous solution of a salt of a polyprotic carboxylic acid as the absorption medium.

As shown in FIG. 1, an optionally conditioned process feed gas stream 10 comprising the sulfur dioxide-containing source gas is introduced to a sulfur dioxide absorber 12 having one or more theoretical stages where it is contacted with a chilled, lean aqueous absorption medium comprising a salt of a polyprotic carboxylic acid to absorb the sulfur dioxide. The lean aqueous absorption medium is introduced to the absorber via line 20. Sulfur dioxide absorber comprises a vertical column or tower containing a gas/liquid contact zone 14 comprising means for promoting mass transfer between gas and liquid phases that may comprise a bed of random packing such as saddles or rings, structured packing, or other contacting device. Preferably, in order to maximize transfer of sulfur dioxide, the process feed gas stream is contacted concurrently with the lean aqueous absorption medium. As shown in FIG. 1, process feed gas stream 10 is introduced through a gas inlet near the bottom of the absorber tower 12 and enters the bottom of gas/liquid contact zone 14, while lean aqueous absorption medium 34 recirculated from sulfur dioxide stripper 48 (described later herein) is introduced via line 20 through a liquid inlet near the top of the tower and is distributed over and enters the top of the gas/liquid contact zone. A sulfur dioxide-enriched absorption liquor stream 36 exiting the bottom of gas/liquid contact zone 14 is withdrawn from a liquid outlet 38 near the bottom of absorber tower 12 and an exhaust gas stream 18 substantially free of sulfur dioxide exiting the top of zone 14 is withdrawn from a gas outlet 16 near the top of the tower.

Although a conventional, randomly packed tower may be employed as absorber 12, those skilled in the art will appreciate that other configurations may be suitably employed. For example, absorber tower 12 may contain structured packing or comprise a tray tower, in either of which the process streams preferably flow countercurrently. Although countercurrent flow between the process feed gas stream 10 and the aqueous absorption medium in the absorber 12 is preferred, the absorber may be operated co-currently. However, such an arrangement tends to negatively impact absorption capacity and efficiency and is generally less preferred.

The concentration of the polyprotic carboxylic acid salt absorbent in the aqueous absorption medium and the rate of absorption medium flow should be such that, at the temperature prevailing at the liquid exit of the absorber, excess absorptive capacity remains in the absorption liquor. Preferably, the remaining capacity is at least 10%, preferably at least 20% of the total absorptive capacity entering the absorber. For this purpose, the absorbent concentration and absorption medium flow rate entering the absorber should be sufficient to provide stoichiometric excess in the rate of absorbent flowing through the absorber relative to the rate at which sulfur dioxide is to be recovered from the process feed gas stream, preferably in excess relative to the total sulfur dioxide content of the feed stream, thus to compensate for several factors such as: the sulfur dioxide content remaining in the absorption medium after the regeneration thereof; the concentration of sulfur dioxide in the sulfur dioxide-enriched stripper gas; the possible presence of slightly acidic components such as carbon dioxide; but mainly to compensate for desirably relatively weak absorptive affinity of preferred polyprotic carboxylic acid salt absorbents. A relatively weak absorptive affinity is preferred in order to facilitate the subsequent desorption of sulfur dioxide via a mild temperature increase and/or reduction of pressure. Accordingly, the concentration of polyprotic carboxylic acid salt absorbent in the aqueous absorption medium necessary to attain the desired removal efficiency varies with the acid employed, the concentration of sulfur dioxide in the gas to be treated as well as the mass transfer characteristics of the absorber and can be readily determined by one skilled in the art. Typically, the stoichiometric equivalents ratio of sulfur dioxide absorbed per mole of polyprotic carboxylic acid salt in the absorption solution ranges from about 0.1 to about 1. In the case of an aqueous absorption solution comprising the sodium salt of malic acid to treat a gas comprising about 2600 ppmv (parts per million by volume) sulfur dioxide, the concentration of malate or bimalate in the absorption solution can suitably range from about 0.5 mole % to about 7 mole %.

The mass flow rate ratio (L/G) of lean aqueous absorption medium and process feed gas stream 10 introduced into sulfur dioxide absorber 12 necessary to achieve substantial transfer of sulfur dioxide from the source gas to the absorption solution may be determined by conventional design practice. More particularly, the L/G can be selected based on the contaminant content of the gas stream entering the absorber, the concentration of polyprotic carboxylic acid salt absorbent in the aqueous absorption medium, and the unit absorptive capacity of the absorbent at liquid/gas temperature prevailing in the absorber. Typically, the L/G is selected such that the flow of polyprotic carboxylic acid salt absorbent into the absorber is in at least 10 to 20% excess over the flow of contaminant gas into the absorber. The optimal extent of excess depends on the rate of mass transfer and heat transfer in the gas/liquid contact zone.

Preferably, the sulfur dioxide absorber is designed and operated such that the sulfur dioxide content of exhaust gas stream 18 exiting the absorber is less than about 500 ppmv, more preferably less than about 200 ppmv (e.g., as low as 10-20 ppmv). This trace amount of sulfur dioxide along with carbon dioxide, oxygen, nitrogen and other inerts contained in the process feed gas stream are eliminated from the system as part of the exhaust gas stream 18 vented from the top of the absorber. The exhaust gas is in substantial equilibrium with the absorption solution, and depending on the water vapor content of the process feed gas stream fed to the absorber, and the absorber conditions, there may be a net gain or loss of water in the absorber. If necessary, a blower is used to drive the gases to the stack. In order to achieve satisfactory emission standards, exhaust gas stream 18 may be passed through a mist eliminator or similar device for recovery of entrained liquid before being discharged through the stack. In addition or alternatively, in some cases exhaust gas stream 18 may be heated by indirect heat exchange in a heat exchanger with the incoming flow of process feed gas or using other heating media so that any plume will not have the tendency to descend after being emitted through the stack.

As mentioned above, a source of metal base is added to the aqueous absorption medium and reacts with the polyprotic carboxylic acid to form the metal salt absorbent. Added metal base will first react with any sulfuric acid present in the aqueous absorption medium and the remainder will react with the polyprotic carboxylic acid. For example, in the case of an aqueous absorption solution comprising malic acid, the metal base will react with malic acid and bimalate to form bimalate and malate. In such a system, the molar ratio of bimalate salt to malate salt in the buffered aqueous absorption medium fed to the absorber typically ranges from about 0.5 to about 2, preferably from about 0.7 to about 1.5.

The optimum ratio will differ depending on a variety of factors, including sulfur dioxide inlet gas concentration, cooling water temperature, outlet absorber gas temperature, and lean aqueous absorption medium flow rate. For example, at a relatively low sulfur dioxide inlet concentration (e.g., about 300 ppm) a higher ratio of about 1.3 may be employed, and for a high sulfur dioxide inlet concentration (e.g., about 10,000 ppm) a lower ratio of about 0.8 may be employed. Additionally, if the inlet gas temperature is relatively warm (i.e., 40-50° C.) a higher ratio may be used to compensate for the lower solubility of sulfur dioxide at these elevated temperatures. Furthermore, a lower flow rate of lean aqueous absorption medium into the absorber will require a higher ratio to provide sufficient absorption capacity, while a lower ratio may be suitably employed at higher absorption medium flow rates.

A source of metal base (e.g., sodium hydroxide, potassium hydroxide, etc.), can be combined with lean aqueous absorption medium 34 before being introduced near the top of absorber tower 12. For example, the lean aqueous absorption medium fed to absorber 12 via line 20 comprises metal base originating from base storage tank 24, make-up polyprotic carboxylic acid absorbent originating from storage tank 28, demineralized water from source 26, and regenerated lean aqueous absorption medium 34 recirculated from sulfur dioxide stripper 48. The lean aqueous absorption medium is optionally passed through solvent chiller 22 before being introduced into absorber tower 12. One skilled in the art can use known pH control techniques and instrumentation to add base to the regenerated absorption solution contacted with the sulfur dioxide-containing gas in the absorber to maintain the desired degree of neutralization and concentration of the polyprotic carboxylic acid salt absorbent.

In the embodiment shown in FIG. 1, a slip stream 200 of the sulfur-dioxide enriched absorption liquor 36 exiting absorber 12 is removed and subjected to treatment with an anion exchange resin in anion exchange unit or system 204 for removal of divalent sulfur oxyanion species that accumulate in the aqueous absorption solution as described in detail below.

Any portion of the sulfur-dioxide enriched absorption liquor 36 that is not treated for removal of divalent sulfur oxyanion impurities is combined with the return stream 208 from the anion exchange system, preheated to an intermediate temperature in a solvent interchanger 44 (as described below), and introduced into sulfur dioxide stripper 48 wherein sulfur dioxide is dissociated from the polyprotic acid salt absorbent and desorbed from the absorption liquor.

Stripper 48 comprises a vertical column or tower containing a vapor/liquid contact zone 50 comprising means for promoting mass transfer between the gas and liquid phases. Like absorber 12, stripper tower 48 can be configured in the form of a packed tower containing a bed of conventional random packing, structured packing, trays or any other gas-liquid contacting device. The lower (stripping) section of vapor/liquid contact zone 50 within stripper tower 48 may be fed with live steam generated in accordance with the present invention (as described below) and used to remove the sulfur dioxide from the absorption liquor. The upper (refining) section of vapor/liquid contact zone 50 is used to reduce the amount of water in the desorbed sulfur dioxide.

A primary sulfur dioxide-enriched stripper gas effluent 54, comprising sulfur dioxide substantially saturated with water vapor, is produced in the overhead of stripper 48 above vapor/liquid contact zone 50 and withdrawn from vapor outlet 52 at the top of tower 48; and a regenerated absorption solution 58 exiting the vapor/liquid contact zone is withdrawn from a liquid outlet 60 at the bottom of the tower and recirculated back to absorber 12 for further absorption of sulfur dioxide from the feed gas stream thereby completing the cycle. Although countercurrent flow between the sulfur dioxide-enriched absorption liquor and stripping steam in the stripper as shown in FIG. 1 is preferred, the stripper may be operated co-currently. However, such an arrangement tends to negatively impact stripping efficiency and is generally less preferred.

The average temperature of the sulfur dioxide absorption medium in absorber 12 is generally maintained in the range of from about 10° C. to about 70° C. In accordance with the present invention, the average temperature of the sulfur dioxide absorption liquor in the absorber is preferably maintained from about 20° C. to about 60° C. Although in general the absorption of sulfur dioxide is enhanced at lower absorption medium temperatures, the absorption liquor needs to be heated from the absorption temperature to a temperature sufficiently high and/or under reduced pressure to release the sulfur dioxide and providing this sensible heat leads to higher energy demands. During regeneration, it is also desirable to reduce the amount of water vaporized to lower the energy consumed and avoid low water concentrations in the absorption medium that may cause the precipitation of the polyprotic carboxylic acid salt absorbent. The overall efficiency of the sulfur dioxide absorption/desorption process is improved when the absorption is relatively strongly dependent on temperature and within a narrower range of temperatures between the absorption and desorption stages of the cycle.

The average temperature of the sulfur dioxide absorption liquor in stripper 48 is generally maintained in the range of from about 60° C. up to the boiling point of the absorption solution at the stripper operating pressure.

The absorption and desorption of sulfur dioxide may be enhanced by increasing or decreasing the operating pressures of absorber 12 and stripper 48, respectively. Suitable operating pressures in absorber 12 are from about 70 to about 200 kPa absolute. Increased pressure in the absorber increases the fraction of sulfur dioxide which the absorption medium can absorb, but the absorption is preferably carried out at relatively low pressure thereby reducing equipment costs. Similarly, suitable operating pressures in stripper 48 are from about 40 to about 200 kPa absolute, but higher or lower operating pressures may be employed.

Temperature control within absorber 12 and stripper 48 may be achieved by controlling the temperature of various process streams fed to these operations. Preferably, the temperature in stripper 48 is maintained within the desired range by controlling the temperature of the sulfur dioxide-enriched absorption liquor 46 and steam introduced near the bottom of the stripper in the stripping section of vapor/liquid contact zone 50. Again referring to FIG. 1, the sulfur dioxide-enriched absorption liquor 36 from absorber 12 at a temperature of from about 10° C. to about 70° C., more preferably from about 20° C. to about 60° C., is typically passed through solvent interchanger 44 where it is preheated to an intermediate temperature by indirect transfer of heat from regenerated absorption medium 62 being recirculated from stripper 48 to sulfur dioxide absorber 12. Transfer of heat from the regenerated absorption medium to the absorption liquor within the interchanger increases the absorptive capacity of the regenerated absorption medium and heats the absorption liquor to help promote stripping of sulfur dioxide therefrom. If further heating is required in order to achieve the desired temperature in the stripper, sulfur dioxide-enriched liquor stream 36 may be passed through a solvent heater 40, where it is preheated (e.g., by indirect transfer of heat from a recovered sulfur dioxide product stream exiting the process), and/or further heated by indirect heat exchange with steam or with hot liquid stream 78 from the water column described below. In certain advantageous embodiments, the sulfur dioxide-enriched absorption liquor is heated by transferring heat from process feed gas stream and/or regenerated sulfur dioxide absorption medium without the addition of extraneous heat. In such an embodiment, the temperature of the process feed gas stream is preferably not reduced to below about 50° C. and the difference in temperature between the sulfur dioxide-enriched absorption liquor introduced to the stripper and the regenerated absorption medium is less than about 40° C.

Regenerated aqueous absorption medium 58 exits the bottom of stripper 48 at a temperature of from about 60° C. to about 140° C. and the portion 62 recirculated to absorber 12 is cooled in interchanger 44 by transfer of heat to sulfur dioxide-enriched absorption liquor 42. Similarly, if further cooling is required in order to maintain the desired temperature in the absorber, regenerated absorption medium leaving interchanger 44 may be eventually passed through solvent chiller 22 and further cooled by indirect heat exchange with cooling tower water. Use of heat interchanger 44 reduces the energy demands of the system such that use of a solvent heater and/or solvent chiller may not be required.

The illustrated process includes features that enhance energy efficiency by recovery of energy from the wet sulfur dioxide-enriched gas stream produced in the desorption stage and the energy required for stripping sulfur dioxide from condensate produced in the desorption stage is substantially recovered by use of the stripped condensate as a source of stripping steam for the absorption liquor stripper. Further energy input is required to vaporize the condensate at a pressure sufficient for it to flow into the base of the stripper. The latent heat in the water vapor component of the stripper gas provides that source of energy.

For example, as shown in the embodiment of FIG. 1 and described in U.S. Pat. No. 8,940,258, primary stripper gas effluent 54 from absorption liquor stripper 48 is optionally compressed in an apparatus suitable for increasing the pressure of the primary stripper gas effluent to provide a source of energy for generating stripping steam. Suitable apparatus include mechanical compressors and thermal compressors (i.e., steam-jet ejectors). As shown in FIG. 1, the primary stripper gas effluent is preferably compressed by passage through a steam-jet ejector 66. Where sulfur dioxide is recovered from the tail gas of a contact sulfuric acid plant, steam generated in sulfur trioxide absorption heat recovery may provide the motive steam for the ejector.

Modest compression of the stripper gas exiting the absorption liquor stripper creates the modest temperature differential sufficient for transfer of heat from the compressed stripper gas to the stripped condensate, thereby vaporizing the stripped condensate at a pressure sufficient to drive the resulting steam into the stripper.

Compression of the wet sulfur dioxide-containing gas effluent from the stripper preferably increases the pressure of the stream by an increment of from about 30 kPa to about 65 kPa. Separation of sulfur dioxide is enhanced if stripper 48 is operated at lower pressures (e.g., under vacuum) to increase the relative volatility of sulfur dioxide with respect to water and enhance desorption and decrease the number of theoretical stages needed for a given reflux. In addition, lower pressures lead to lower temperatures in the system allowing the use of lower pressure steam for heating the sulfur dioxide-enriched absorption liquor. However, recovery of energy is optimized at moderately higher operating pressures, and this also reduces the requisite diameter of tower 48 and associated capital cost. By way of example, operating the stripper under a slight vacuum (e.g., −35 kPa gauge) and modestly increasing the pressure of the sulfur dioxide-enriched stripper gas exiting the stripper (e.g., to about 20 kPa gauge) represents one economic approach. Nevertheless, operating the stripper at or above atmospheric pressure may also be an attractive approach. Economic optimization can determine the specific operating conditions. Balancing these considerations, the pressure of the primary stripper gas effluent exiting the absorption liquor stripper is most preferably maintained from about 40 to about 170 kPa absolute).

The pressurized flow of sulfur dioxide-containing stripper gas is directed to a primary stripper gas cooler/condenser 68. A substantial portion of the water vapor is condensed from the primary stripper gas effluent in cooler/condenser 68 by indirect transfer of heat to a cooling medium. Stripped condensate in stream 98 flowing to cooler/condenser 68 from a condensate stripper or water column 84 (the operation of which is described below) serves as the cooling medium and the latent heat of condensation is transferred to the stripped condensate thereby generating steam that is used as a stripping medium in absorption liquor stripper 48. As shown in FIG. 1, stripped condensate stream 98 exiting column 84 is directed to a vapor-liquid separator 72 (e.g., steam drum) and circulates via line 74 between the separator and cooler/condenser 68 where transfer of heat from the primary stripper gas generates steam 70 for the stripper. Stripped condensate and steam are separated in separator 72, the steam is directed to stripper 48 via line 73, at least a portion of the condensate circulates to primary stripper gas cooler/condenser 68 via line 74 and another portion may optionally be recirculated and combined with regenerated sulfur dioxide absorption solution 62 via line 76 and returned to absorber 11 and/or a portion 96 may be purged from the system. Alternatively, the condensate side of stripper gas cooler/condenser 68 may be designed to allow disengagement of steam from water within the heat exchanger itself, allowing a steam flow free of entrained water to flow directly from the cooler/condenser to the stripper, without the need for a separate vapor/liquid separator.

Steam generated in primary stripper gas cooler/condenser 68 is introduced to stripper 48 where it contacts the absorption liquor in vapor/liquid contact zone 50, both supplying heat to the absorption liquor and functioning as a stripping gas for removing sulfur dioxide from the liquid phase. Heating of the liquid phase in the absorption liquid stripper reduces the equilibrium concentration of sulfur dioxide therein and enhances the driving force for transfer of sulfur dioxide to the vapor phase. In transferring heat to the liquid phase, steam generated from stripped condensate in cooler/condenser 68 partially condenses within the stripper, thus functioning essentially as a condensable stripping gas. Optionally, stripping heat supplied by steam generated from stripped condensate in the primary stripper gas cooler/condenser may be supplemented by heat supplied from an extraneous source in a reboiler 64 through which liquid phase from the absorption liquor stripper is circulated. The auxiliary reboiler provides full flexibility in the water balance control of the process. Typically, absorption liquor to be passed through the reboiler is withdrawn from a sump of the stripper and returned to the lower portion of the vapor/liquid contact zone 50 above the sump.

In primary stripper gas cooler/condenser 68, most of the water vapor content of the primary stripper gas effluent 54 is condensed and thus most of the latent heat removed by transfer to stripped condensate returning from condensate stripper 84. Aqueous condensate obtained by condensing water vapor from the primary stripper gas effluent comprises dissolved sulfur dioxide. This condensate is removed from cooler/condenser 68 and fed via line 82 to condensate stripper or water column 84 and heated (e.g., with steam or a reboiler) to desorb sulfur dioxide and produce a condensate stripper gas comprising water vapor and sulfur dioxide desorbed from the aqueous condensate. As shown in FIG. 1, condensate stripper gas is combined with wet sulfur dioxide-containing vent gas 80 from primary stripper gas cooler/condenser 68. The combined final condensate stripper gas 86 exiting the top of condensate stripper column 84 is cooled to a temperature normally below about 70° C. in a low temperature condenser 88 (e.g., with cooling water at 50° C.) to condense water vapor and produce a product stream 90 comprising recovered sulfur dioxide. After cooling, the recovered sulfur dioxide product stream 90 is removed from the sulfur dioxide recovery process and directed to a destination where it may be used, e.g., to the drying tower or a catalytic stage of a contact sulfuric acid plant for conversion to sulfur trioxide, to a Claus process operation for generating elemental sulfur, to an alkali metal sulfite or bisulfite manufacturing process, to a papermaking operation, or to a compression and refrigeration unit for liquefaction to liquid sulfur dioxide.

Stripped condensate stream 98 depleted in sulfur dioxide exits the bottom of condensate stripper column 84 and is directed to the primary stripper gas cooler/condenser 68 wherein condensation of water vapor from the compressed primary stripper gas effluent 54 transfers heat to the stripper condensate, thereby generating steam for use as a combined heating medium and stripping gas (e.g., as a condensing stripping medium) in absorption liquor stripper 48. Optionally, a portion 96 may be purged from the system.

The extent of compression of primary stripper gas effluent 54 from absorption liquor stripper 48 is necessarily sufficient to bring the compressed vapor to a temperature high enough that steam having a pressure higher than the pressure in the lower (stripping) section of vapor/liquid contact zone 50 within tower 48 can be generated by heating stripped condensate in primary stripper gas cooler/condenser 68. But the extent of compression is preferably controlled to a minimum necessary for steam generated from stripped condensate to flow into the stripper. More particularly, it is preferred that steam is generated from stripped condensate at a temperature not more than about 30° C. higher than the temperature of the liquid phase within the absorption liquor stripper at liquid outlet 60 thereof, or more particularly, not more than about 20° C. or not more than about 5 to about 10° C. higher than the temperature of the liquid phase exiting the bottom of the vapor/liquid contact zone 50 within the stripper. In certain particularly preferred embodiments, the temperature of the steam produced by heating stripped condensate in the primary stripper gas cooler/condenser 68 is no more than equal to, or may be even lower than, the temperature of the liquid phase within the absorption liquor stripper at the liquid outlet thereof, or at the bottom of the vapor/liquid contact zone. More generally, it is preferred that the temperature of the steam generated in the primary stripper gas cooler/condenser 68 vary from the temperature of the regenerated absorption medium within the stripper at the liquid outlet thereof, or from the temperature of the liquid phase exiting the lower (stripping) section of the vapor/liquid contact zone within the absorption liquor stripper, by no more than about ±10° C. In order for steam to flow into the absorption liquor stripper, the pressure of the steam generated in the cooler/condenser 68 is necessarily higher than the total pressure in the stripper, and therefore higher than the equilibrium vapor pressure of the liquid phase within the stripping section of the vapor/liquid contact zone, even at the liquid phase exit of the stripping section where the partial pressure of sulfur dioxide approaches zero as a limit.

The consequent vapor phase water pressure driving force thus causes condensation of water vapor to occur in the stripper irrespective of temperature differences between the vapor phase and the liquid phase, resulting in condensation and heating of the liquid phase within the stripping section of the vapor/liquid contact zone even if the steam is introduced into the zone is a temperature no greater than, or even slightly below, the temperature of the liquid phase. Because of the depressant effect of the polyprotic carboxylic acid salt absorbent, in the liquid phase, the vapor pressure of the liquid phase may be slightly lower than the pressure of the steam at the same temperature, or even where the temperature of the liquid phase is slightly higher than the temperature of the steam.

A portion of stripped condensate from condensate stripper 84 as discharge water may also optionally be used to condition the sulfur dioxide-containing source gas or process feed gas stream 10. As shown in FIG. 1, stripped condensate from vapor-liquid separator 72 is passed through line 78 and introduced into a saturator 104 upstream of sulfur dioxide absorber 12 with respect to feed gas flow. The saturator may comprise a one stage contactor (e.g., generally consisting of a packed column or tower containing random or structured packing or a spray column), wherein the stripped condensate contacts the gas stream, thereby increasing the humidity of the feed gas entering the sulfur dioxide absorber. The saturator also cools the sulfur dioxide-containing gas by evaporative cooling and removes acid gases (e.g., sulfuric acid, hydrochloric acid, sulfur trioxide) prior to entering the absorber. The saturator advantageously permits humidification of the feed gas stream utilizing lower quality water, which provides an incremental cost savings as compared to humidifying the gas in the absorber where the water utilized should be de-ionized or distilled to avoid the build-up of impurities. Although the aqueous effluent or water stream 218 exiting the saturator is saturated with sulfur dioxide, the volume of this stream is small. The water stream 218 exiting the saturator may be removed from the process or may be utilized in the acidification of the anion exchange feed stream as described in further detail below.

Further details and operating conditions are disclosed in U.S. Pat. No. 8,940,258, the entire contents of which are expressly incorporated herein by reference. Furthermore, as described in U.S. Pat. No. 8,940,258, alternative flow schemes may be employed to generate the temperature differential so that latent heat reclaimed by condensation of water vapor from the primary stripper gas may be transferred to the stripped condensate for generation of the stripping stream used in the absorption liquor stripper. For example, as described and shown in FIG. 2 of U.S. Pat. No. 8,940,258, the steam generated from the stripped condensate can be compressed (e.g., by a mechanical compressor or a steam-jet ejector) during flow between the steam outlet of the cooler/condenser 68 and the absorption liquor stripper 48. In such an alternative embodiment, the diameter of the stripper 48 is sized, and the packing or other mass transfer promoting structure within the vapor/liquid contact zone of the stripper is designed to avoid excessive pressure drop during passage of the gas/vapor phase upwardly through the zone. The primary stripper gas outlet and line used to transfer the primary stripper gas effluent to cooler/condenser 68 are also sized to avoid excessive pressure drop. By preserving a pressure on the primary stripper gas side of the cooler/condenser 68 that is higher than the pressure on the stripped condensate side of that exchanger, a temperature differential is established by which heat is transferred to the stripped condensate as water vapor condenses from the primary stripper gas effluent and steam is generated on the condensate side for use in stripper 48. The process as shown in FIG. 1 and this alternative embodiment provide comparable energy efficiency; however, an advantage of the process shown in FIG. 2 of U.S. Pat. No. 8,940,258 is the substantial absence of sulfur dioxide from the stream subject to compression. This means that the fluid being compressed is generally less corrosive than the fluid compressed in the process of FIG. 1, and thus provides savings in both maintenance and selection of materials of construction for the compressor or ejector.

Anion Exchange Resin Operations

Over time, treatment of the source gas for the removal and recovery of sulfur dioxide leads to the accumulation of divalent sulfur oxyanion impurities in the aqueous absorption medium. The specific divalent sulfur oxyanion species that accumulate depends on the composition of the source gas fed to the process and operating conditions maintained in the absorption and desorption stages. These impurities include, without limitation, sulfate ($SO_4^{2-}$) thiosulfate ($S_2O_3^{2-}$) dithionate ($S_2O_6^{2-}$), trithionate ($S_3O_6^{2-}$), and higher polythionate ($S_xO_6^{2-}$) anions. Typically, from about 0.5 to about 1% of the sulfur dioxide recovered from the source gas fed to absorber 12 is oxidized with oxygen normally present in the source gas and ultimately forms sulfate anions in the recirculating aqueous absorption medium. The build-up of sulfate negatively impacts the efficient removal of sulfur dioxide and if not removed will eventually start precipitating in the coldest regions of the process as metal sulfate salts (e.g., sodium sulfate).

Accordingly, in the process of the present invention, at least a portion of the recirculating aqueous absorption medium is periodically contacted with an anion exchange resin to selectively remove sulfate and other sulfur oxyanion impurities.

Ion exchange resins are used in a variety of industrial processes for separation of ionic species. An ion exchange resin is contacted with a liquid feed containing one or more ionic constituents that are then bound to the resin material to produce a treated stream having a reduced concentration of the ions bound by the resin. Once the ion exchange resin has become saturated with the ions removed from the feed, separation efficiency deteriorates and the compositions of the feed and treated streams become nearly identical, the resin is chemically regenerated to remove the collected ions and restore the binding affinity of the resin for the ions of interest.

In the present invention, a basic anion exchange resin is used to selectively remove sulfate and other divalent sulfur oxyanions from the aqueous absorption medium. In accordance with a preferred embodiment, the anion exchange resin comprises a weak basic anion exchange resin preferably selected from functionalized styrene-divinyl benzene, polystyrenic and polyacrylic exchange resins. Weak base anion exchange resins such as these do not contain exchangeable ionic sites, and therefore readily function as acid adsorbers. In addition to these resins having a high capacity for adsorption, they can be easily regenerated with caustic or other strong base. Weak base anion exchange resins in the present system are believed to require a strong acid in the feed solution in order to convert the amine groups to quaternary ammonium ions. At this point, the active group is fully dissociated and is capable of exchanging anions in the system. An example of this can be seen below:

$$RN(CH_3)_2 + H_2SO_4 \rightarrow RN(CH_3)_2H + HSO_4^- \text{ (quaternary amine salt)}$$

This reaction is very effective and therefore not readily reversible. In order to reverse this reaction, the active groups require a strong base which is capable of supplying $OH^-$ ions to neutralize the quaternary ammonium group, thereby removing the hydrogen and regenerating the anion exchange resin.

The anion exchange resin is typically selected in light of several factors, including: (1) the specific gravity of the resin relative to that of aqueous absorption medium to be treated; (2) the propensity of the resin to form fines that could plug the anion exchange apparatus; (3) the degree of crosslinking; and (4) the degree of selectivity for the sulfur oxyanions to be removed. Preferably, the specific gravity of the anion exchange resin is greater than that of the aqueous absorption medium to be treated such that the resin material does not tend to float when contacted with the anion exchange feed stream. Further, the anion exchange resin is desirably mechanically and chemically robust so as to resist physical degradation over repeated cycles and also exhibits a strong affinity for binding the sulfur oxyanions present in the aqueous absorption medium to be treated.

A variety of basic anion exchange resins may be employed in the practice of the present invention. Shown below in Table 1 is a list of weak base anion exchange resins that have been evaluated, as well as some of the characteristics of these resins. The listed resin materials are commercially available from Purolite Corporation (Bala Cynwyd, Pa.) or Lenntech BV (Delft, Netherlands). Weak basic anion exchange resins from other suppliers could also be suitably employed.

TABLE 1

| | | | | | | | |
|---|---|---|---|---|---|---|---|
| | | | WEAK BASE ANION EXCHANGERS | | | | |
| | TYPE | IONIC FORM | TOTAL VOLUME CAPACITY eq/l | MOISTURE RETENTION % | SPECIFIC GRAVITY | MAXIMUM SWELLING % | REMARKS & APPLICATIONS |
| PUROLITE A100Plus | Macroporous Polystyrenic | Free Base | 1.3 | 53-62 | 1.04 | Free Base→Cl 25 | Most widely used weak basic anion (WBA) exchange resin in Industrial Waste Treatment (IWT) due to its good resistance to organic fouling and high operating capacity. Also used in the food industry as A100SPlus. |
| PUROLITE A103SPlus | Macroporous Polystyrenic | Free Base | 1.5 | 51-58 | 1.04 | Free Base→Cl 25 | Higher capacity resin more commonly employed for the demineralization and decolorization of glucose syrups and other organic solutions. |
| PUROLITE A109 | Macroporous Polystyrenic | Free Base | 1.0 | 58-65 | 1.05 | Free Base→Cl 25 | Special WBA resin with primary amine functional groups. Excellent chemical and thermal stability. High resistance to osmotic shocks. |
| PUROLITE A110 | Macroporous Polystyrenic | Free Base | 2.0 | 60-66 | 1.05 | Free Base→Cl 50 | Special WBA resin with primary amine groups. High capacity. |
| PUROLITE A111 | Macroporous Polystyrenic | Free Base | 1.7 | 56-62 | 1.02 | Free Base→Cl 40 | High moisture, high capacity WBA resin without any quaternary ion exchange groups. Can offer significant advantages for high organic bearing waters and sweeteners solutions. |

TABLE 1-continued

WEAK BASE ANION EXCHANGERS

| | TYPE | IONIC FORM | TOTAL VOLUME CAPACITY eq/l | MOISTURE RETENTION % | SPECIFIC GRAVITY | MAXIMUM SWELLING % | REMARKS & APPLICATIONS |
|---|---|---|---|---|---|---|---|
| PUROLITE A120S | Macroporous Polystyrenic | Free Base | 1.2 | 58-63 | 1.04 | Free Base→Cl 25 | Demineralization and decolorization of sweeteners solutions. Also used for color bodies removal from waste waters. |
| PUROLITE A133S | Macroporous Polystyrenic | Free Base | 1.8 | 46-51 | 1.04 | Free Base→Cl 25 | High capacity WBA resin for demineralization and decolorization of glucose solutions. |
| PUROLITE A830 | Macroporous Polystyrenic | Free Base | 2.75 | 50-56 | 1.10 | Free Base→Cl 20 | Very high exchange capacity polyamine resin developed for special applications such as desulfation of seawater. |
| PUROLITE A847 | Gel Polyacrylic | Free Base | 1.6 | 56-62 | 1.08 | Free Base→Cl 25 | First choice acrylic WBA resin for IWT offering higher capacity than polystyrenic resins and good rinse characteristics. Good reversible removal of organics due to more hydrophilic acrylic polymer. |
| LEWATIT A-365 | Macroporous Polyacrylate/ Divinylbenzene | Free Base | 3.4 | 44-51 | 1.13 | Free Base→Cl 18 | High operating capacity, good physical stability, and excellent resistance to mechanical osmotic shock. Fully regenerable with NaOH and other weak bases. Regenerant consumption is close to stoichiometric in nature. |

In addition to sulfate and other possible divalent sulfur oxyanions, the recirculating aqueous absorption medium contains several other ionic species, including bisulfate, sulfite, bisulfite and anions of the polyprotic carboxylic acid salt absorbent (e.g., sodium bimalate and/or sodium malate). The divalent anion of the polyprotic carboxylic acid metal salt absorbent tends to be as strongly absorbed by the basic anion exchange resin as sulfate and other divalent sulfur oxyanion species. Accordingly, the presence of the divalent anion of the polyprotic carboxylic acid metal salt absorbent as well as the monovalent anion of the polyprotic carboxylic acid metal salt (which is converted to the divalent form when contacted with the basic anion exchange resin) undermines the selectivity for the removal of the divalent sulfur oxyanion species and could lead to unacceptable losses of the polyprotic carboxylic acid metal salt absorbent.

However, in accordance with the present invention, it has been discovered that by acidifying the feed stream to the anion exchange resin prior to contact with the anion exchange resin, the selectivity for the removal of divalent sulfur oxyanion species is enhanced such that losses of the polyprotic carboxylic acid salt absorbent may be suitably controlled. By acidifying the anion exchange feed stream, at least a portion of the polyprotic carboxylic acid salt absorbent therein (e.g., sodium bimalate and/or sodium malate) is converted to the corresponding acid (e.g., malic acid). The polyprotic carboxylic acid in the anion exchange feed stream is converted to the monovalent anion when contacted with the basic anion exchange resin. The monovalent anion of the carboxylic acid absorbent is not absorbed as strongly by the basic anion exchange resin as sulfate and other divalent sulfur oxyanion species. This allows for selective removal of the divalent sulfur oxyanion species while minimizing losses of the polyprotic carboxylic acid salt absorbent.

In the context of the present invention selectivity is understood to mean that the total effluent discharged during regeneration of the anion exchange resin (e.g., by contacting the anion exchange resin with a solution of a strong base to remove the impurities absorbed by the anion exchange resin), comprises substantially more divalent sulfur oxyanion species than anions of the polyprotic carboxylic acid salt absorbent. Typically, the molar ratio of sulfate and other divalent sulfur oxyanion species to anions of the polyprotic carboxylic acid salt absorbent in the total effluent discharged during regeneration of the anion exchange resin is at least about 10:1, at least about 20:1, at least about 30:1, at least about 40:1, at least about 50:1, at least about 75:1, at least about 100:1, at least about 150:1, or at least about 200:1.

Stated alternatively, the selectivity is measured as the weight of divalent sulfur oxyanion species to the total weight of divalent sulfur oxyanion species and anions of the polyprotic carboxylic acid salt absorbent (water free basis) recovered during regeneration of the anion exchange resin. Typically, when measured in this manner, the selectivity will be greater than about 90%, greater than about 95%, greater than about 97%, greater than about 98%, or even greater than about 99%.

Acidification of the feed stream fed to the anion exchange resin can be accomplished by the addition of an acidifying agent prior to contact with the resin. The acidifying agent can be any acidic compound that is otherwise compatible with the process and sufficiently strong to convert the polyprotic carboxylic acid salt absorbent to the corresponding acid (i.e., having a pKa value lower than the lowest pKa of the polyprotic carboxylic acid). For example, in the case of an aqueous absorption solution comprising the metal salt of malic acid, the anion exchange feed stream can be acidified by an acidifying agent having a pKa value lower than about 3. Examples of suitable acidifying agents include sulfur dioxide, sulfuric acid, sulfurous acid, and combinations thereof. As described in greater detail below, in accordance with a preferred embodiment, the anion exchange feed is acidified using acidifying agent comprising sulfurous acid and/or sulfur dioxide obtained elsewhere in the regenerative sulfur dioxide recovery process.

The anion exchange feed stream is typically acidified to a pH value such that a substantial portion of the polyprotic carboxylic acid salt absorbent therein is converted to the corresponding acid. For example, the pH can be used to control the acidification of the anion exchange feed stream and ensure that at least about 50%, at least about 75%, or preferably at least about 95% of the total amount of the polyprotic carboxylic acid absorbent present in the acidified anion exchange feed stream is converted to the acid form. In the case of an aqueous absorption medium comprising the metal salt of malic acid, the pH of the anion exchange feed stream is preferably adjusted to less than about 4, less than about 3, or less than about 2.8, or less than about 2.5 prior to contacting the anion exchange resin. In such a system, the anion exchange feed stream may be acidified to a pH from about 1 to about 4, from about 1.5 to about 3, from about 2 to about 3, from about 2.1 to about 2.8, from about 2.1 to about 2.5, or from about 2.1 to about 2.3 prior to contact with the anion exchange resin. Lower pH values in the acidified anion exchange feed stream than that required to convert substantially all of the polyprotic carboxylic acid salt absorbent to the corresponding acid can be tolerated, but may decrease energy inefficiency and does not significantly enhance absorption selectivity.

The portion of the recirculating aqueous absorption solution sent to treatment with an anion exchange resin to remove sulfate and other divalent sulfur oxyanions can be diverted from any portion of the solvent loop between absorber 12 and stripper 48. In accordance with a preferred embodiment shown in FIG. 1, a slip stream 200 of the sulfur-dioxide enriched absorption liquor 36 removed from the sulfur dioxide absorber is subjected to treatment with an anion exchange resin in anion exchange system 204. The sulfur-dioxide enriched absorption liquor contains a significant concentration of absorbed sulfur dioxide. As a result, a large proportion of the polyprotic carboxylic acid salt absorbent is already present as the corresponding acid, thereby reducing the amount of acidifying agent added prior to contact with the anion exchange resin.

As mentioned above, sulfurous acid and/or sulfur dioxide obtained from the sulfur dioxide stripping or other operations can optionally be used as the acidifying agent, thereby avoiding the need for an extraneous source of strong acid or other acidifying agent. For example, as shown in FIG. 1, a portion of the final condensate stripper effluent 86 exiting the top of condensate stripper column 84 and typically containing from about 2% to about 4% by weight sulfurous acid may be directed via stream 202 and combined with the fraction of sulfur-dioxide enriched absorption liquor in slip stream 200. Alternatively, an acidification stream comprising sulfurous acid can be obtained from the rectification section of stripper 48. In a further alternative, a portion of recovered sulfur dioxide obtained in product stream 90 can be used as the acidifying agent. Another potential source of acidifying agent can originate from stream 218 exiting saturator 104 (e.g., at least a portion designated as stream 222). As described above, stream 218 exiting the saturator is a solution of sulfur dioxide saturated water (i.e., sulfurous acid). The use of sulfurous acid and/or sulfur dioxide obtained elsewhere in the system allows for a reduction in material costs as well as avoiding disadvantages inherent in using an extraneous source of sulfuric acid or other source of strong acid as an acidifying agent. For example, use of sulfuric acid as the acidifying agent increases sulfate introduced into the system and would require an anion exchange system of increased capacity and increased consumption of caustic or other strong base during regeneration.

Figure 10:
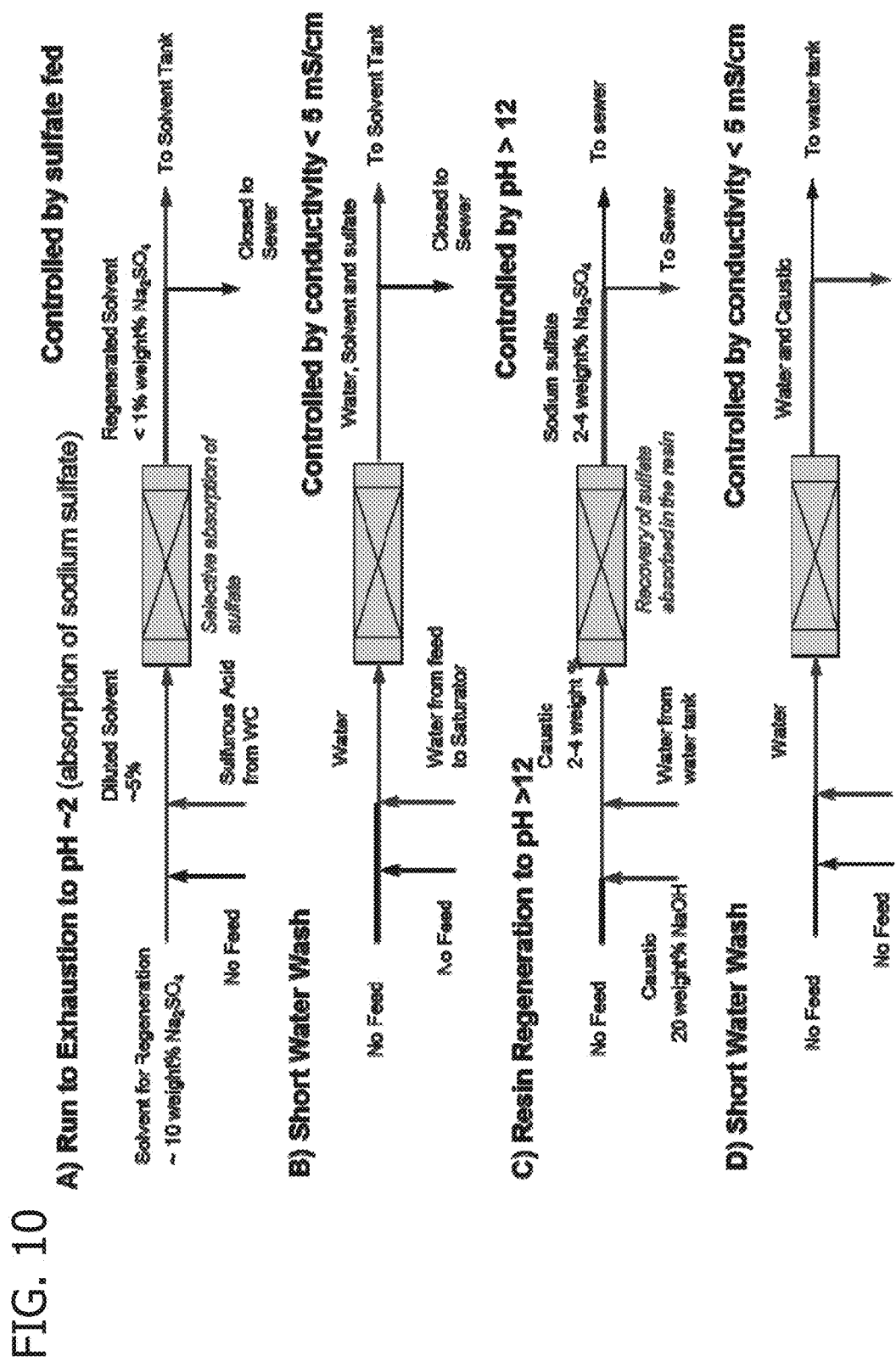
FIG. 10 summarizes the stages of an anion exchange cycle as might be used in the removal of divalent sulfur oxyanions.

The acidified anion exchange feed stream is directed to anion exchange system 204 and contacted with a basic anion exchange resin. A non-limiting example of an anion exchange cycle is set forth in FIG. 10 and includes four stages, A) though D). In stage A)—Absorption/Exhaustion, the acidified anion exchange feed solution contacts the basic anion exchange resin, whereby divalent sulfur oxyanion impurities present are preferentially absorbed to produce a treated aqueous absorption medium from which impurities have been removed and an anion exchange resin charged with impurities. Other anions absorbed by the anion exchange resin during this stage, including any anions of the polyprotic carboxylic acid salt absorbent, will be displaced by sulfate and other divalent sulfur oxyanions which are more strongly absorbed. In stage B)—First Water Wash, the flow of the acidified anion exchange feed is stopped and the charged anion exchange resin is subjected to a short water wash. Next, in stage C)—Regeneration, the charged anion exchange resin is contacted with a solution of a strong base (e.g., caustic) to convert ammonium ions in the resin back to amine groups and elute sulfate anions. In stage D)—Second Water Wash, the regenerated resin is water washed again, after which the resin is ready for further absorption of sulfate from the acidified anion exchange feed stream. The anion exchange system can include multiple beds of basic anion exchange resin to allow for continuous processing in staggered cycles as needed. FIG. 10 also provides examples of typical concentrations of the anion exchange feed streams and exits streams during stages A) though D).

During the absorption/exhaustion stage, the treated stream, substantially free of sulfur oxyanion impurities, is directed back to the solvent loop. For example, as shown in FIG. 1, the treated stream may be recombined with the remainder of the sulfur-dioxide enriched absorption liquor 36 removed from the sulfur dioxide absorber via return stream 208. Alternatively, the treated stream may be directed to a storage tank via stream 206. The exhaust liquid from the anion exchange resin collected during the first water wash may be directed back to the solvent loop. During the regeneration stage, the sulfate and other sulfur oxyanion impurities eluted from the basic anion exchange resin can be directed via line 206 to the sewer or waste water treatment facility for disposal, or recovered as a by-product. The effluent from the regeneration stage typically has a low concentration of sulfate and other sulfur oxyanion impurities (e.g., 2-3 wt %), and it may be beneficial to remove water (e.g., by evaporation) from the collected effluent. The conductivity can be monitored to ascertain the concentration of sulfate and other sulfur oxyanion impurities in the concentrated effluent and the end point of the water removal step. In some embodiments, the water removed from the effluent collected during the regeneration stage may be of sufficient purity that it can be redirected to the resin system and utilized in the water wash stage(s). The exhaust liquid collected from the anion exchange resin during the second water wash can be used to dilute the strong base used in the regeneration stage or sent to the sewer or waste water treatment facility for disposal.

The effluent from the regeneration stage may additionally or alternatively be processed using electrodialysis. An electrodialysis operation transports salt ions from one solution to another through an ion exchange membrane under the influence of an applied electrical potential difference. In the context of the present disclosure, electrodialysis of the effluent from the regeneration stage comprising sodium salts of sulfate and other sulfur oxyanion impurities produces solutions comprising caustic (NaOH) and sulfuric acid ($H_2SO_4$). The caustic may advantageously be used in regeneration of the basic anion exchange resin, while the sulfuric acid may be collected as product. The use of electrodialysis for processing the effluent from the regeneration stage reduces waste disposal demands and produces valuable chemical products that may be recycled and utilized in the regenerative sulfur dioxide recovery process.

Water for the water wash stages of the anion exchange cycle may comprise deionized water, condensate (e.g., water removed from the anion exchange resin effluent collected during the regeneration stage), or water from the water column tails, all of which typically only contain minimal ion content.

The pH and/or conductivity of the exhaust streams exiting the anion exchange resin can be monitored and used to determine when to advance to the next stage of the anion exchange cycle. For example, the pH of the treated aqueous absorption medium exiting the anion exchange resin during the absorption/exhaustion stage can be monitored to determine when the resin has become saturated. As the resin becomes saturated, less of the sulfate and other divalent sulfur oxyanions in the feed will be absorbed and their concentration in the treated stream will increase. Near exhaustion of the anion exchange resin, the pH of the treated stream sharply decreases. An example of this can be seen in FIG. 2. Such a decrease in the pH of the treated stream, indicates that the anion exchange resin has reached saturation and is ready for regeneration. In a similar fashion, a decrease in the measured conductivity of the exhaust liquid from the anion exchange resin can be used to determine the effectiveness and end of the first and second water wash stages. During the water wash step, as the conductivity of the resin approaches 0 mS/cm (e.g., less than 5 mS/cm), the water wash has neared completion. An insufficient water wash, wherein the conductivity of the water wash effluent is not less than about 5 mS/cm, may result in the buildup of undesirable ions such as metal ions (e.g., sodium). For example, a water wash wherein the water wash step is stopped when the effluent has a conductivity of about 10, about 15, or about 20 mS/cm has been observed to result in considerable buildup of sodium ions in the system. A buildup of sodium ions due to an insufficient water wash step may require further remedial steps to be taken. The duration of the regeneration stage can be monitored by measuring the pH of the exhaust liquid from the anion exchange resin. The flow of strong base can be continued until the pH reaches a minimum value (e.g., greater than about 12) that indicates that the resin has been substantially fully regenerated.

Although the treatment described above is effective for controlling the accumulation of divalent sulfur oxyanion species in the aqueous absorption solution, in accordance with some embodiments of the present invention, an oxidation inhibitor can be included in the absorption solution to reduce oxidation and production of divalent sulfur oxyanion species in the aqueous absorption solution (e.g., bisulfite and sulfite to bisulfate and sulfate contaminants, respectively). Several different types of oxidation inhibitors may be useful in the practice of the present invention, including: oxygen scavengers and free radical trappers such as p-phenylenediamine, hydroquinone, glutathione, and hydroquinone monoethyl ether; inhibitors of $NO_x$-catalyzed oxidation such as ascorbic acid; and chelating agents such as ethylenediaminetetraacetic acid (EDTA) which sequester and inhibit metal-catalyzed oxidation. Various salt forms of the oxidation inhibitors may also be suitably employed where appropriate. Such oxidation inhibitors can be employed individually or in various combinations and can be added as needed to the aqueous absorption solution introduced to the sulfur dioxide absorber. Depending on the type of inhibitor(s) employed, the concentration of the oxidation inhibitor in the absorption solution typically ranges from a few ppm to from about 1 to about 10 percent by weight. An excess amount of inhibitor may be added (e.g., at least about 100 ppm), since the inhibitors will gradually be consumed by oxidation. The inhibitor may be fed continuously to the absorption solution to account for consumption of the inhibitor over time. For example, in one embodiment where ascorbic acid is added continuously to the absorption solution, the amount added sufficient to offset the consumption or deactivation is typically from about 2 to about 20 ppm/hr or from about 5 to about 10 ppm/hr relative to the recirculating aqueous absorption solution. In other embodiments, the inhibitor may be added to the absorption solution at a specific ratio relative to the sulfur dioxide in the feed gas fed to the sulfur dioxide absorber. For example, the mass ratio of inhibitor:$SO_2$ fed to the absorber may be at least about 0.0001:1, at least about 0.0005:1, at least about 0.001:1, at least about 0.005:1, or at least about 0.01:1. In certain embodiments, the mass ratio of inhibitor:$SO_2$ fed to the sulfur dioxide absorber is from about 0.0001:1 to about 0.01:1, from about 0.0005:1 to about 0.01:1, or from about 0.0005:1 to about 0.05:1. For example, in some embodiments, the mass ratio of ascorbic acid:$SO_2$ fed to the sulfur dioxide absorber is about 0.001:1. As understood by those skilled in the art, the amount of inhibitor fed continuously to the absorption solution as well as the mass ratio of inhibitor to $SO_2$ fed to the sulfur dioxide absorber will vary depending on the activity of the particular oxidation inhibitor used in the process. Ascorbic acid, glutathione and hydroquinone are effective in inhibiting oxidation in a sodium malate absorption solution, and EDTA is expected to be effective as an oxidation inhibitor when metals are present in the absorption solution.

In the context of the present invention, use of an oxidation inhibitor may reduce the size and capacity of the anion exchange resin bed that is needed in order to achieve and maintain the desired concentration of divalent sulfur oxyanions in the aqueous absorption solution. That is, by using an oxidation inhibitor, and reducing the generation of divalent sulfur oxyanion impurities, a lower capacity anion exchange resin bed may be suitably employed to achieve and maintain satisfactory contaminant levels.

In some embodiments, use of ascorbic acid as an oxidation inhibitor is particularly preferred. Ascorbic acid not only acts to reduce the formation of sulfate and other divalent sulfur oxyanions in the system, but is effective as a buffer in the aqueous absorption solution to assist in absorption of sulfur dioxide. Furthermore, it is believed that ascorbic acid, like the monovalent anion of the polyprotic carboxylic acid absorbent, is not absorbed as strongly by the basic anion exchange resin as sulfate and other divalent sulfur oxyanion species. That is, as in the case of the monovalent anion of the polyprotic carboxylic acid absorbent, the anion exchange resin will exhibit similar selectivity for removal of sulfate and other divalent sulfur oxyanions over ascorbic acid. Accordingly, ascorbic acid used as an oxidation inhibitor will not be removed to an appreciable extent during anion exchange resin operations.

Increased acidity in the aqueous absorption solution has the effect of increasing sulfur dioxide stripping efficiency. Thus, leaving a small concentration of dissolved sulfur dioxide or maintaining some sulfate in the absorption solution leads to higher efficiency in the stripper. For example, a small concentration of sulfate and/or sulfurous acid in the stripper makes the regeneration of the absorbing solution less energy intensive. However, the presence of sulfur dioxide in the regenerated absorption medium adversely affects the equilibrium in the absorber. Accordingly, if acidity is regulated by allowing accumulation of components in the recirculating absorption medium/absorption liquor, it is preferable to accomplish this by allowing sulfate ion to accumulate than accumulating any appreciable steady state level of sulfur dioxide. In accordance with one embodiment of the invention, the concentration of sulfate anions is maintained at from about 3 to about 15 weight percent, preferably from about 5 to about 10 weight percent in the recirculating absorption solution and a small fraction of sulfur dioxide is left in the regenerated aqueous absorption solution thus making the solution slightly more acidic and consequently making the desorption of sulfur dioxide less energy intensive.

Cation Exchange Resin Operations

In certain embodiments, a strong acid cation exchange resin may optionally be employed to remove excess sodium or other metal ions accumulating in the absorption solution. In addition to removing excess sodium and maintaining ionic balance, a strong acid cation exchange resin also is effective in removing metals such as aluminum, antimony, arsenic, barium, beryllium, cadmium, calcium, chromium, cobalt, copper, iron, lead, magnesium, manganese, mercury, molybdenum, nickel, potassium, selenium, silver, strontium, tin, vanadium, zinc, and other metals often present in the sulfur dioxide-containing effluents emitted by metallurgical and power plants operations and that act as a catalyst in the oxidation of absorbed sulfur dioxide to sulfate.

The strong acid cation exchange unit or system may be operated in parallel or in series with the weak base anion exchange system as described herein. Preferably, the strong acid cation exchange system is operated in parallel with the weak base anion exchange system by diverting a slip stream of the recirculating absorption solution from a different location in the process and contacting it with the strong acid cation exchange resin. For example, referring to the schematic flow sheet of the process depicted in FIG. 1, a separate slip stream for cation exchange resin treatment may be drawn from the sulfur-dioxide enriched absorption liquor upstream of stripper 48 (e.g., diverted from streams 36, 42, or 46) or from the regenerated absorption solution (e.g., diverted from streams 58, 62, 34, or 20) exiting stripper 48.

The amount of absorption solution diverted for cation exchange treatment, as well as the capacity and configuration of the cation exchange resin system, is largely dependent upon the rate of metal ion buildup in the process. Multiple strong acid cation exchange resin beds may be utilized in staggered cycles so that the slip stream can be continuously treated to remove metal ions. Alternatively, the strong acid cation exchange system may be configured for non-continuous operation.

A non-limiting example of cation exchange cycle includes four stages of operation, A) though D). In stage A)—Absorption/Exhaustion, the cation exchange feed solution contacts the strong acid cation exchange resin, whereby metal ion impurities present (e.g., sodium) are preferentially absorbed to produce a treated aqueous absorption medium from which metal impurities have been removed and a cation exchange resin charged with metal ions. In stage B)—First Water Wash, the flow of the cation exchange feed is stopped and the charged cation exchange resin is subjected to a short water wash. Next, in stage C)—Regeneration, the charged cation exchange resin is contacted with a solution of a strong acid (e.g., sulfurous acid) to displace the metal cations with hydrogen ions and elute the metal cations absorbed by the resin. In stage D)—Second Water Wash, the regenerated resin is water washed again, after which the resin is ready for further absorption of metal ions from the cation exchange feed stream.

In the illustrative embodiment shown in FIG. 1, a cation exchange feed stream comprising slip stream 210 diverted from lean aqueous absorption medium 34 is directed to cation exchange unit or system 212. During the absorption/exhaustion stage, the treated stream, substantially free of metal ion impurities, is directed back to the solvent loop. For example, as shown in FIG. 1, the treated stream may be recombined with the remainder of the lean aqueous absorption medium 34 via return stream 216. Alternatively, the treated stream may be directed to a storage tank via stream 214. The exhaust liquid from the cation exchange resin collected during the first water wash is likewise directed back to the solvent loop via return stream 216. During the regeneration stage, the sodium and other metal ion impurities eluted from the strong acid cation exchange resin can be directed via line 214 to a waste water treatment facility for disposal.

Any strong acid capable of eluting the absorbed metal cations from the cation exchange resin may be used in the regeneration stage. For example, in the embodiment shown of FIG. 1, stream 218 originating from saturator 104 and comprising water saturated with sulfur dioxide (i.e., sulfurous acid), may provide sufficient acidity to regenerate the cation exchange resin and remove absorbed metal ions.

The strong acid cation exchange resin is typically selected in light of several factors, including: (1) the specific gravity of the resin relative to that of slip stream to be treated; (2) the propensity of the resin to form fines that could plug the cation exchange apparatus; (3) the degree of crosslinking; and (4) the degree of selectivity for the metal ions to be removed. Preferably, the specific gravity of the cation exchange resin is greater than that of the slip stream to be treated such that the resin material does not tend to float when contacted with the cation exchange feed stream. Further, the cation exchange resin is desirably mechanically and chemically robust so as to resist physical degradation over repeated cycles and also exhibits a strong affinity for binding the metal ions present in the slip stream to be treated.

A variety of strong acid cation exchange resins may be employed in the practice of the present invention. For example, the strong acid cation exchange resin may comprise polymeric support of styrene divinylbenzene and functional groups of monosulfonic acid or sulfonic acid. Shown below in Table 2 is a list of strong acid cation exchange resin that were evaluated, as well as some of the characteristics of these resins. The listed resin materials are commercially available from Eichrom Technologies LLC (Lisle, Ill.) and Lenntech BV (Delft, Netherlands). Strong acid cation exchange resins from other suppliers could also be suitably employed.

Once a specific resin was chosen, laboratory studies investigated the resin performance using a laboratory column in a series of four steps which included:
1) Absorption/saturation with the feed solution
2) Water wash with deionized water (3-4 resin volumes)
3) Resin regeneration with caustic solution (4 weight % caustic)
4) Water wash with deionized water (3-4 resin volumes).

It was postulated that although there are several anions in the solution, the sulfate, which is strongly absorbed in weak basic anion exchange resins, would be preferentially absorbed. The hypothesis was that although all anions would have been initially absorbed in the resin, if an excess amount of sulfate anions were fed to the resin it would displace the weakly absorbed anions such as sulfite and malate. Table 3 shows reported relative selectivity of a Type 1 functionalized

TABLE 2

STRONG ACID CATION EXCHANGERS

| | TYPE | IONIC FORM | TOTAL VOLUME CAPACITY eq/l | MOISTURE RETENTION % | Density (g/ml) | MAXIMUM SWELLING % | REMARKS & APPLICATIONS |
|---|---|---|---|---|---|---|---|
| DIPHONIX 20-50 mesh | Styrene Divinylbenzene | $H^+$ | 1.59 | 60-70 | 0.7-0.88 | | Comprised of a polymeric support which has been functionalized with diphosphonic and sulfonic acid groups. |
| AMBERLITE IR120 H | Styrene Divinylbenzene strong acid cation exchange resin | $H^+$ | 1.8 | 53-58 | 0.8 | $Na^+ \rightarrow H^+$ 11 | Gel type, strongly acidic, cation exchange resin of the sulfonated polystyrene type. |

EXAMPLES

The following non-limiting examples are provided to further illustrate the present invention.

Example 1

Several weak base anion exchange resins were evaluated for use in the absorption and regeneration of sulfate from malic acid/malate absorption solutions. The absorption and regeneration of malic acid using a weak basic anion exchange resin was investigated to determine desirability. Solutions of malic acid, sodium bimalate, and disodium malate each containing sodium sulfate were fed to a weak base anion exchange resin. Initial studies were done with the Purolite A111 resin. Subsequently, at the demonstration facility discussed below the resin was changed to a denser resin A830.

The A830 resin was more preferred than the A111 resin due to the fact that resin A111 (specific gravity 1.02) was less dense than the aqueous absorption solution (1.05-1.1) and tended to float in the anion exchange vessel. In addition, fines were formed with the A111 resin that tended to plug the screen plates. The A830 resin is a denser resin (specific gravity 1.1) with a higher degree of crosslinking, which accounted for it generating significantly fewer fines and having significantly less swelling. The A830 resin also generally had a higher absorption capacity with a slightly lower selectivity. All of these factors were taken into consideration when choosing an anion exchange resin from Table 1, above. Evaluations done with the A133 resin also provided satisfactory results as compared to resin A111.

styrene-divinyl benzene anion exchange resin for some anions. Type 1 anion exchange resins are the most strongly basic functional group available and therefore have greater affinity for the weak acids. No data was reported on the selectivity of the malate anion, however it was estimated that the malate-selectivity was approximately 2.5.

TABLE 3

Reported Selectivity in Weak Basic Anion Exchange Resins

| Ion | Selectivity |
|---|---|
| $I^-$ | 17 |
| $HSO_4^-$ | 15 |
| $Br^-$ | 6 |
| $HSO_3^-$ | 3 |
| $Cl^-$ | 2.3 |
| $F^-$ | 0.3 |

Example 2

Figure 2:
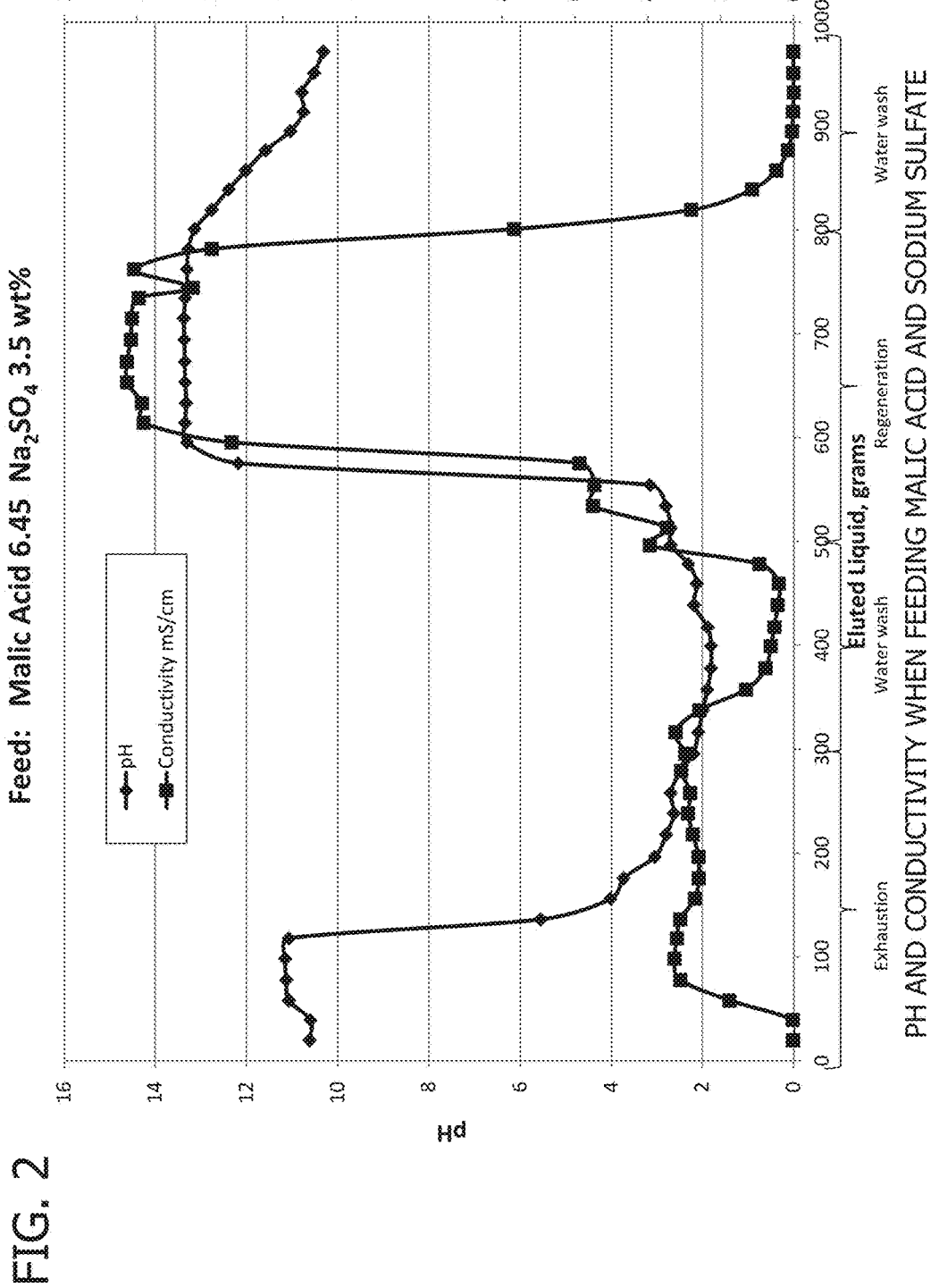
FIG. 2 shows the pH and conductivity of the exhaust solution of Experiment A when malic acid and sodium sulfate are fed.
Figure 3:
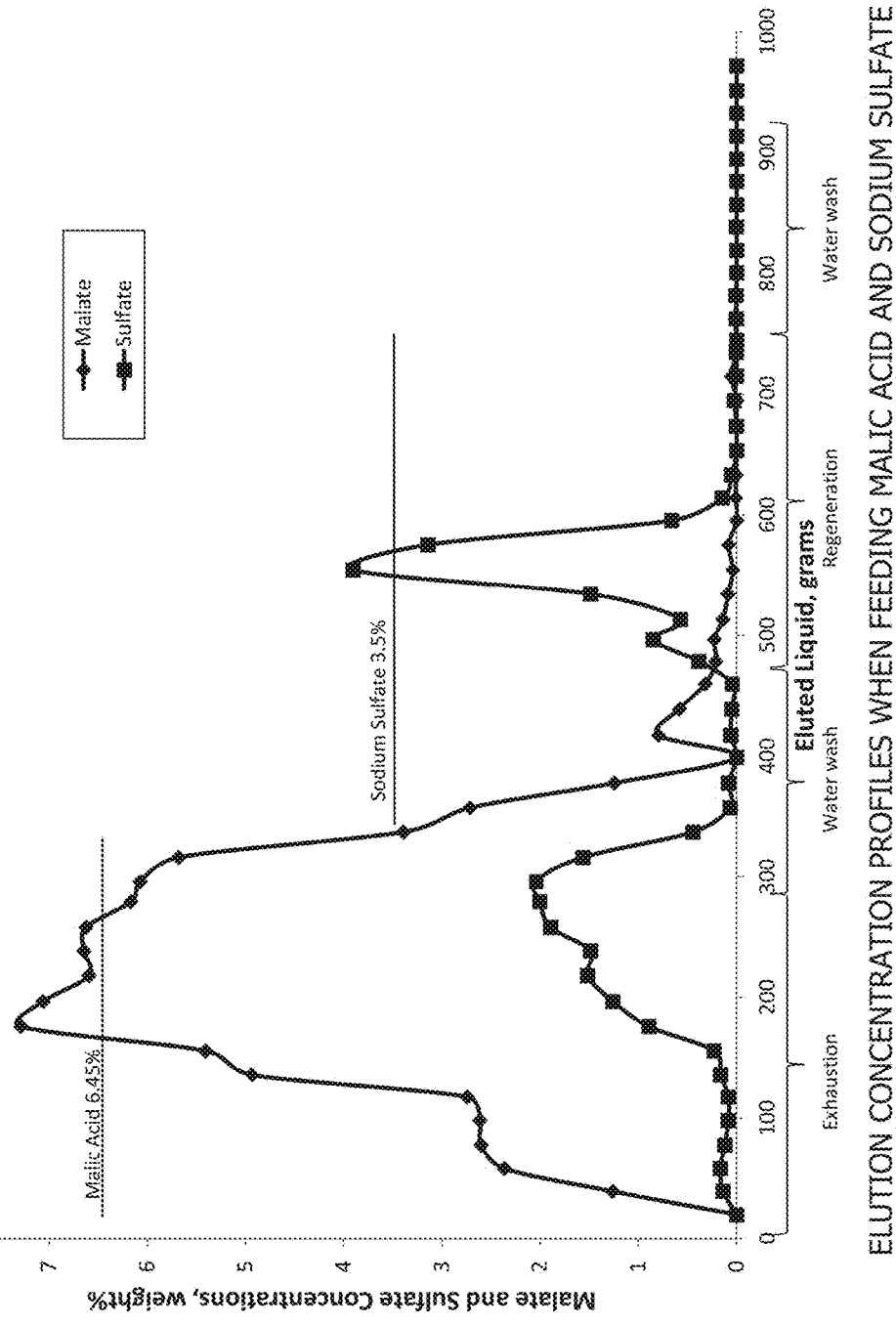
FIG. 3 provides a concentration profile for malic acid and sulfate from Experiment A.

In a first experiment (Experiment A), results shown in FIGS. 2 and 3, a feed solution containing 6.45 weight % malic acid and 3.5 weight % sodium sulfate was fed to an A111 anion exchange resin. The following table shows the concentration and properties of the feed solution.

Feed Concentration Experiment A

| Component | Mass (g) | Weight Percent |
|---|---|---|
| Malic acid | 19.34 | 6.45 |
| Sodium Sulfate | 10.50 | 3.50 |
| Sodium Hydroxide | 0 | 0.00 |
| DI Water | 270.16 | 90.05 |
| Total | 300.00 | |
| Feed pH | 1.98 | |
| Feed Conductivity, mS/cm | 33.21 | |

The pH and conductivity of the eluted solution were measured and samples were taken at regular intervals. FIG. 2 shows the pH and conductivity of the exit solution. At the beginning of the experiment the pH of the exit solution is high, reflecting the pH after resin regeneration. As more feed is added to the column, the pH begins to decrease and approach the pH of the feed solution. Similarly, the conductivity of the solution increasingly approaches the conductivity of the feed solution during the exhaustion step. After the water wash any residual anions are removed and deionized water has little to no conductivity; therefore a conductivity reading can be used to follow the efficiency of the water wash. A conductivity reading below 10 mS/cm can be seen for much of the water wash step indicating that the majority of the exit stream is water. After the water wash is concluded a 4 weight % caustic solution, which has a high pH and conductivity, was fed through the resin. This accounts for the sharp increase in both pH and conductivity. After a pH above 12 is reached the regeneration is completed. Finally, deionized water was fed through the resin one more time, to remove any residual caustic. This again resulted in a downward trend of pH and conductivity.

FIG. 3 shows the concentration profile for malic acid and sodium sulfate. As shown by FIG. 3, there is not a large sulfate breakthrough until later in the exhaustion step. Sulfate is more strongly absorbed than other impurities present in the stream. Because of this, and due to the fact that malic acid is more weakly absorbed than sulfate, a large breakthrough of malic acid is observed during the exhaustion step. During the first water washing step malic acid and sulfate are removed from the resin, as well as any other impurities that may be present. During regeneration very little malic acid is eluted, and the majority of the product is sulfate. This shows that the sulfate was preferentially absorbed in the anion exchange resin, as mainly sulfate ions are being replaced in the resin during the regeneration step. After the regeneration step the residual caustic and sulfate are removed from the resin through a water wash.

During the test shown in FIG. 3 the sulfate concentration in the outlet at exhaustion approached the concentration of sulfate in the feed, but never fully reached the concentration of the feed stream. Feeding sufficient sulfate to completely displace the malic acid is important in achieving a high selectivity. In this particular experiment sulfate removal efficiency was about 91%, but with an excess of sulfate during the absorption, and with a long enough water wash, sulfate removal efficiency above 99% could be achieved. Sufficient water was not fed during the first water wash shown in FIG. 3, which left some malic acid in the resin bed. In order to achieve increased selectivity deionized water should be continually fed to the resin until the conductivity of the exit stream is below 5 mS/cm.

When feeding either disodium malate or sodium malate there was no selectivity in the separation of sulfate from malic acid. In a second experiment (Experiment B), results shown in FIGS. 4 and 5, a solution with a molar ratio of 1.3 moles of caustic per mole of malic acid was fed to an A111 anion exchange resin. The following table shows the concentration and properties of the feed solution.

Feed Concentration for Experiment B

| Component | Mass (g) | Percent |
|---|---|---|
| Malic acid | 32.88 | 8.22 |
| Sodium Sulfate | 47.98 | 11.99 |
| Sodium Hydroxide | 12.80 | 3.20 |
| DI Water | 306.36 | 76.59 |
| Total | 400.02 | |
| Feed pH | 4.27 | |
| Feed Conductivity, mS/cm | 92.71 | |

Figure 4:
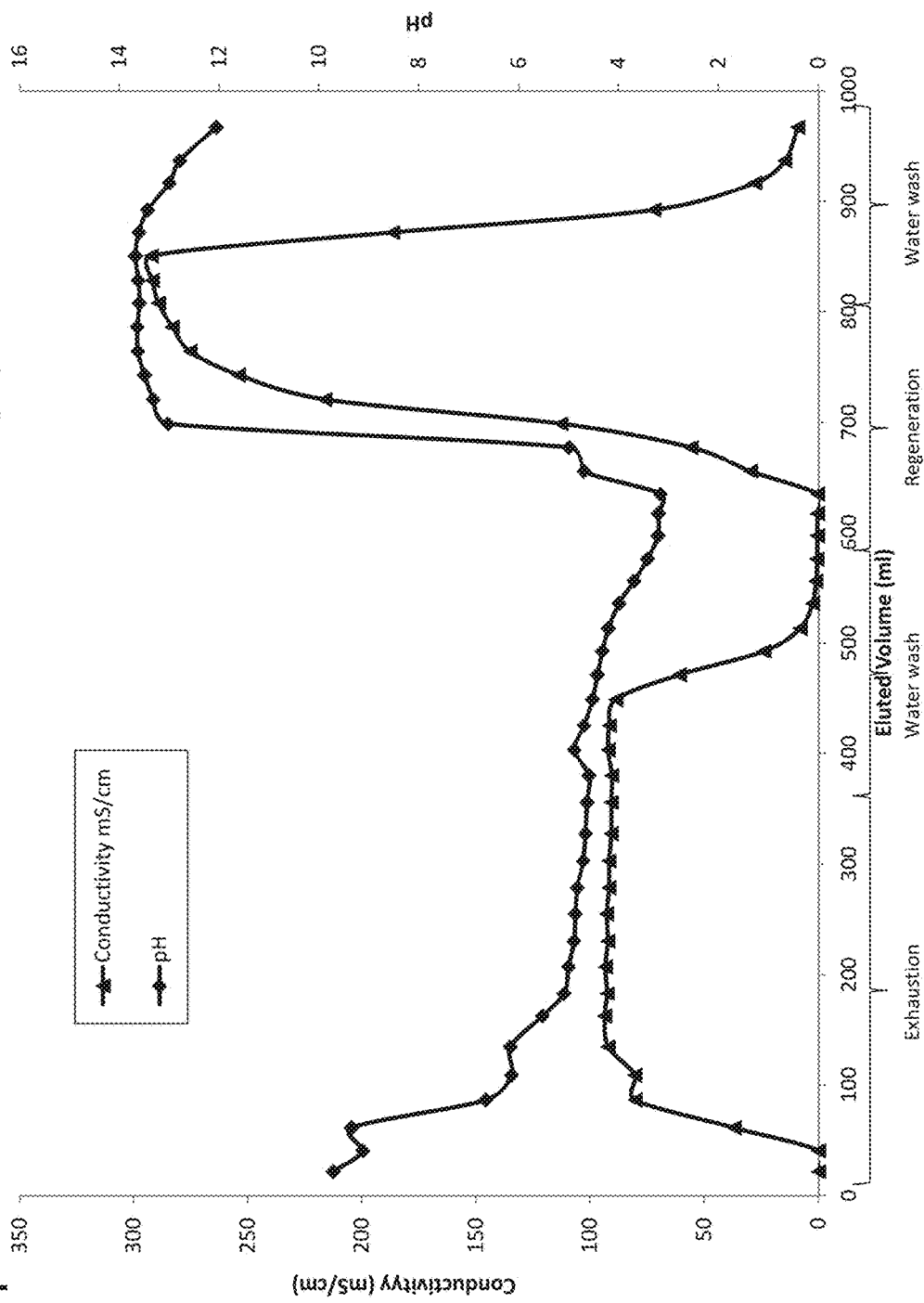
FIG. 4 provides the pH and conductivity during a run of Experiment B.

As seen in FIG. 4 the conductivity reached a value close to the conductivity of the feed during the exhaustion step. During the first water wash the conductivity declined. Because caustic is highly basic and has high conductivity, the conductivity increased as caustic was fed during the regeneration step and declined again with the water wash, when the majority of the exit stream is deionized water. Similarly, the pH starts high as a result of the last regeneration and then approaches the pH of the feed solution during the exhaustion step. The pH decreased during the water wash and then increased as caustic was introduced during the regeneration step.

Figure 5:
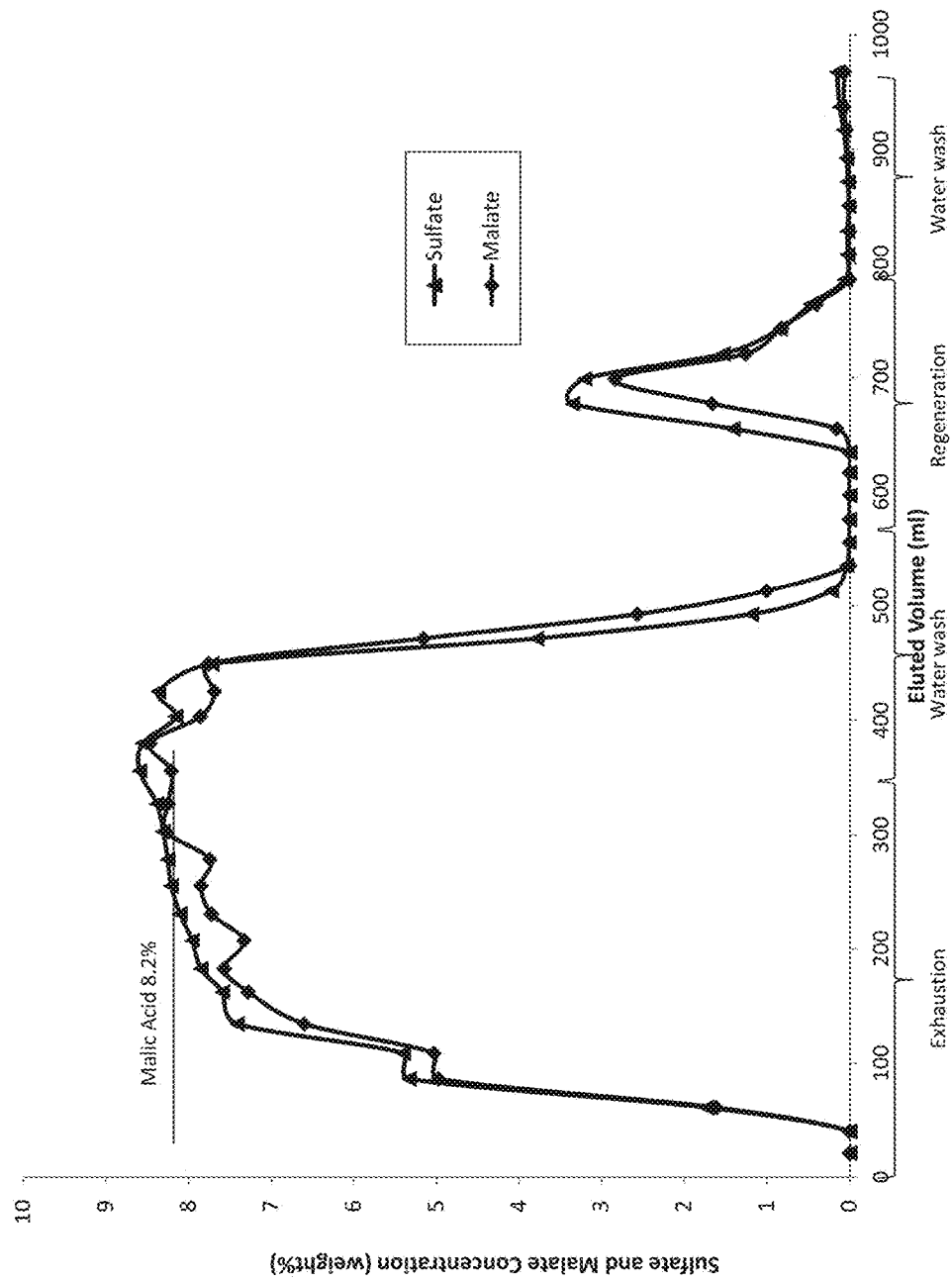
FIG. 5 provides a concentration profile during a run of Experiment B.

The concentration at the outlet of the resin bed was also tracked, as shown in FIG. 5. The concentration profiles for sulfate and malate are similar during the entire process, and specifically during the exhaustion step. The concentration drops after the first water wash because the majority of the exit stream is deionized water. During regeneration, which removes those compounds absorbed by the resin during exhaustion, very similar concentrations for both sulfate and malate are observed. This indicates that the resin absorbed both malate and sulfate in near equal amounts and that there is no selectivity when the malic acid is not in the acidic form before being fed to the resin.

Based on these results, adding a strong acid to change the form of the malate to malic acid in the feed stream to the anion exchange resin was further investigated. Sulfuric acid could be used to acidify the malate, but this approach would require the additional cost of using sulfuric acid and the corresponding amount of caustic. In accordance with a preferred embodiment, sulfurous acid is used to acidify the anion exchange resin feed stream for selective separation of sulfate from malic acid. Furthermore, sulfurous acid is produced during the regenerative process for the selective removal and recovery of sulfur dioxide and could be recovered from the stripping column. Therefore, using sulfurous acid does not require the addition of caustic or the added expense of an external caustic line. Additionally, there is a saturated solution of sulfur dioxide in water in the reflux line of the rectification section of the water column which provides an excellent source of sulfurous acid (in a concentration of approximately 4 weight %) that can be used to acidify the feed stream to the anion exchange resin. Likewise, there is a saturated solution of sulfur dioxide in water in the saturator, upstream of the sulfur dioxide absorber with respect to feed gas flow, that may be utilized to acidify the feed stream to the anion exchange resin.

Example 3

Based upon the above hypothesis, a further experiment was carried out (Experiment C) where sulfurous acid was added to the feed stream fed to an A111 anion exchange resin in order to convert malate to malic acid. The following table shows the concentration and properties of the feed solution.

Feed Concentration for Experiment C

| Component | Mass (g) | Percent |
| --- | --- | --- |
| Malic Acid | 19.73 | 4.93 |
| Sodium Sulfate | 28.82 | 7.20 |
| Sodium Hydroxide | 7.64 | 1.91 |
| Sulfurous Acid | 15.20 | 3.80 |
| DI Water | 329.02 | 82.17 |
| Total | 400.41 | |
| Feed pH | 2.5 | |
| Feed Conductivity, mS/cm | 78.8 | |

Figure 6:
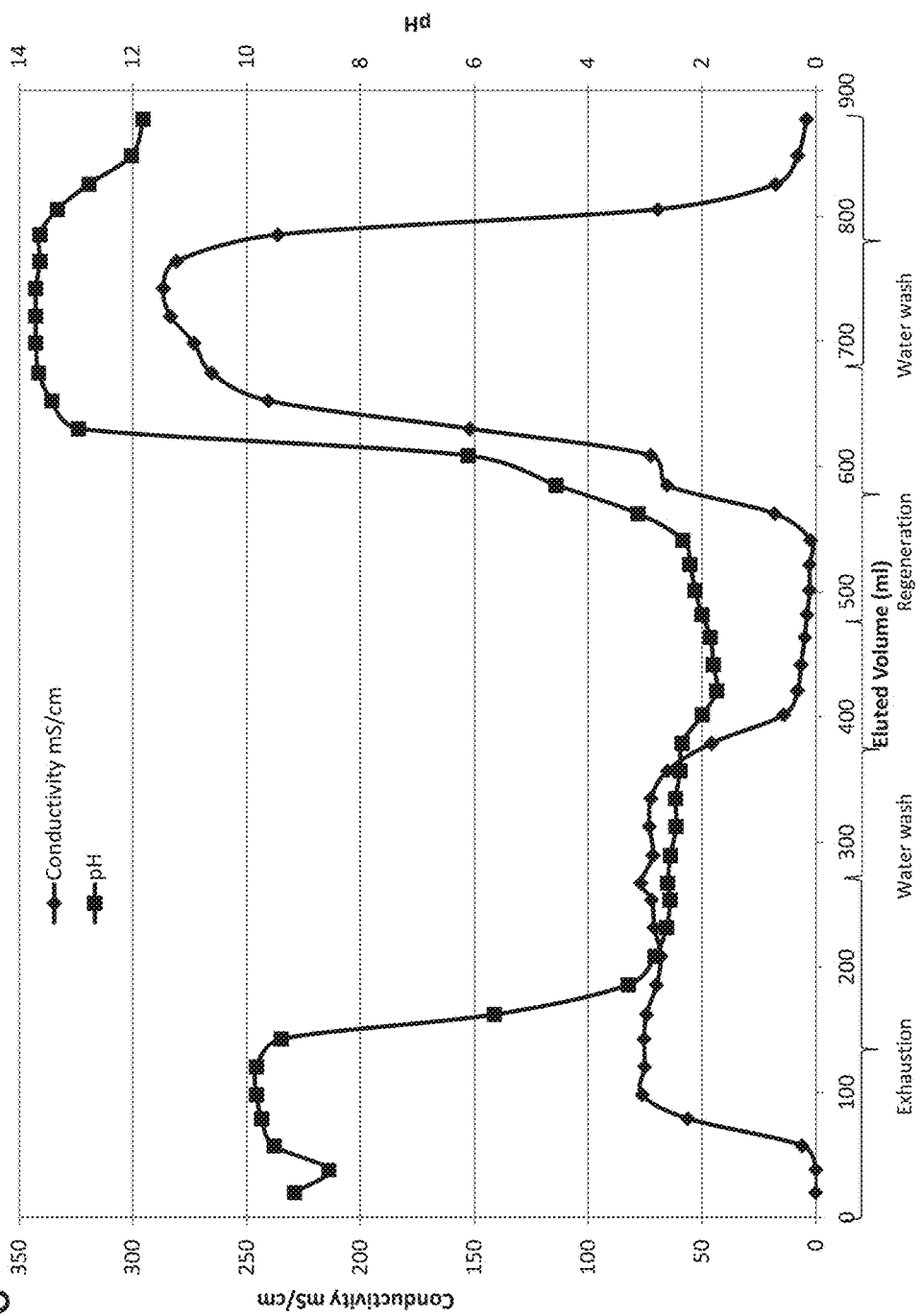
FIG. 6 provides conductivity and pH profiles during four steps of the cycle of Experiment C.
Figure 7:
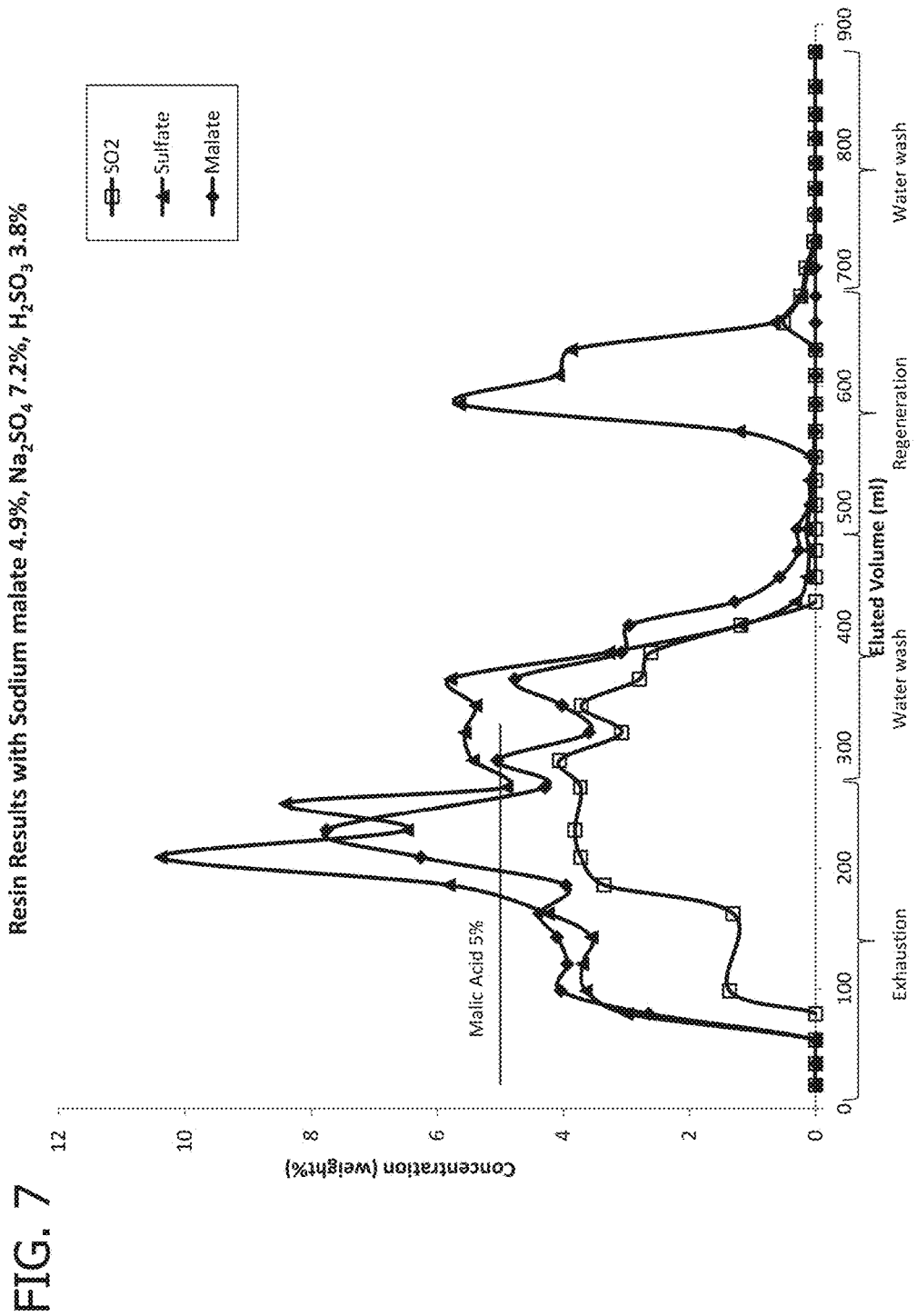
FIG. 7 provides concentrations of sulfate, malate, and sulfite at the outlet of the column of Experiment C.

The results of this experiment can be seen in FIGS. 6 and 7. In FIG. 6 the conductivity and pH profiles during the four steps of the cycle are shown. The results were similar to those observed in the previous experiments. Concentration results are shown in FIG. 7.

The concentrations of the sulfate, malate, and sulfite (reported as dissolved $SO_2$) at the outlet of the column were also measured. Since all three of these ions are present in the solution, all of them will be absorbed to some point by the resin. However, because the sulfate anions are more strongly absorbed, the sulfate anions were anticipated to displace any malate or sulfite ions that would be absorbed in the resin. As long as a sufficient amount of sulfate ions were fed to the resin, malate and sulfite ions would be displaced. Additionally, if the sulfate ions truly displaced the malate and sulfite ions, during the regeneration step sulfate ions should be observed preferentially from the exit stream. As FIG. 7 shows, during the regeneration sulfate ions were eluted and very small amounts of sulfite and malate were observed. This shows that during the exhaustion step sulfate ions were preferentially absorbed by the resin, to the exclusion of malate and sulfite.

In this experiment over 99% selectivity in removing sulfate over malic acid was observed. Based on the number of active site in the resin there was a column efficiency of 88%.

Figure 8:
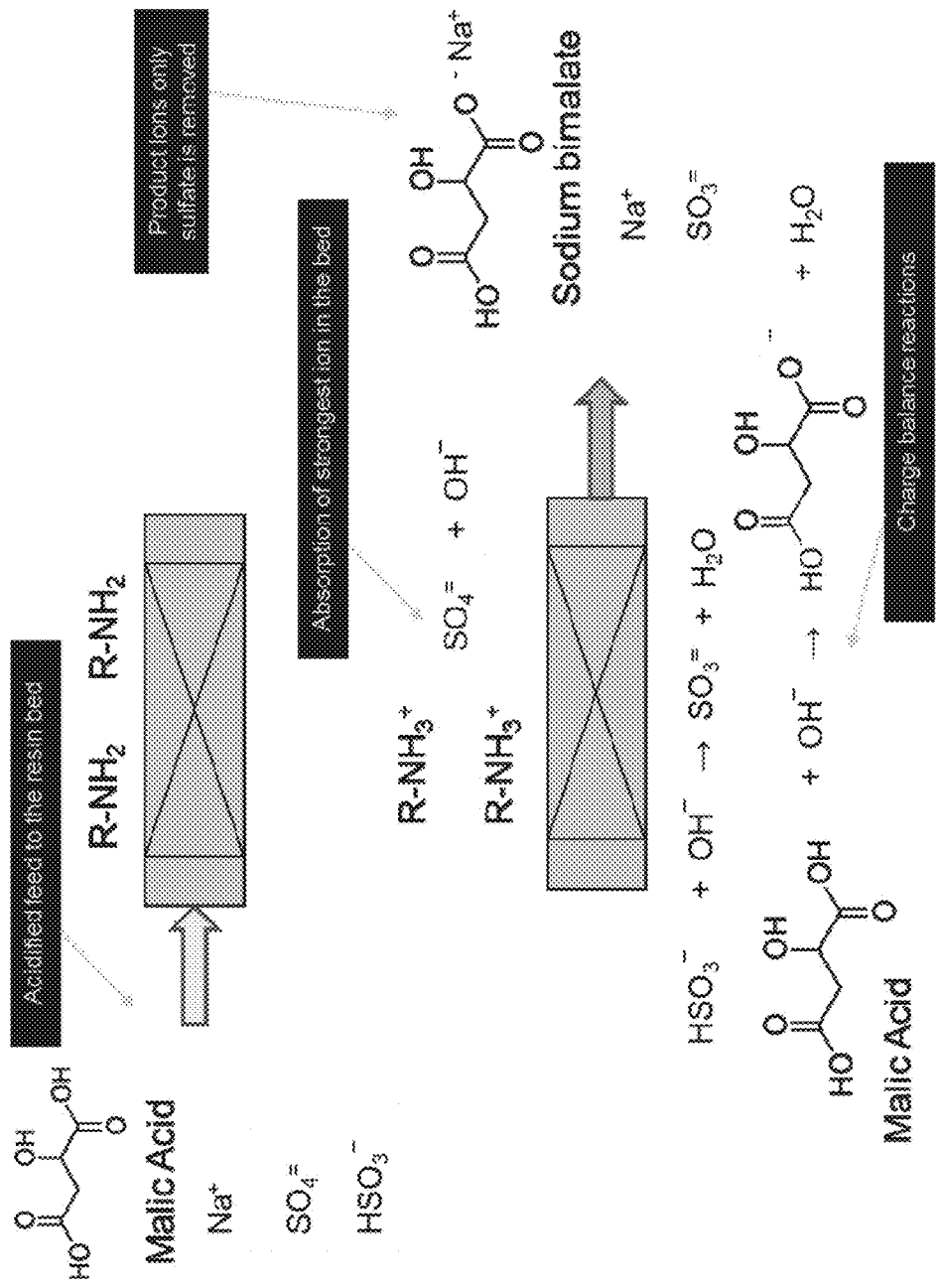
FIG. 8 shows the process scheme of the anion exchange during the absorption step.

The different selectivity in separating malate from sulfate can be better explained by the reactions that take place during the absorption and regeneration steps of the anion exchange cycle. When feeding malic acid to the resin it reacts forming sodium bimalate as shown in FIG. 8.

Since the sodium bimalate is monovalent it is not absorbed as strongly as sulfate, which is divalent. If the process began with bimalate or malate in the feed, divalent malate would be observed in the resin. Observations have shown that divalent malate ions are as strongly absorbed in the resin as sulfate, and do not offer any separation selectivity. Therefore, a monovalent bimalate in the solution is necessary to observe the selective removal of sulfate ions over malate. This is accomplished by acidifying the feed stream fed to the anion exchange resin before it contacts the anion exchange resin as discussed above.

Figure 9:
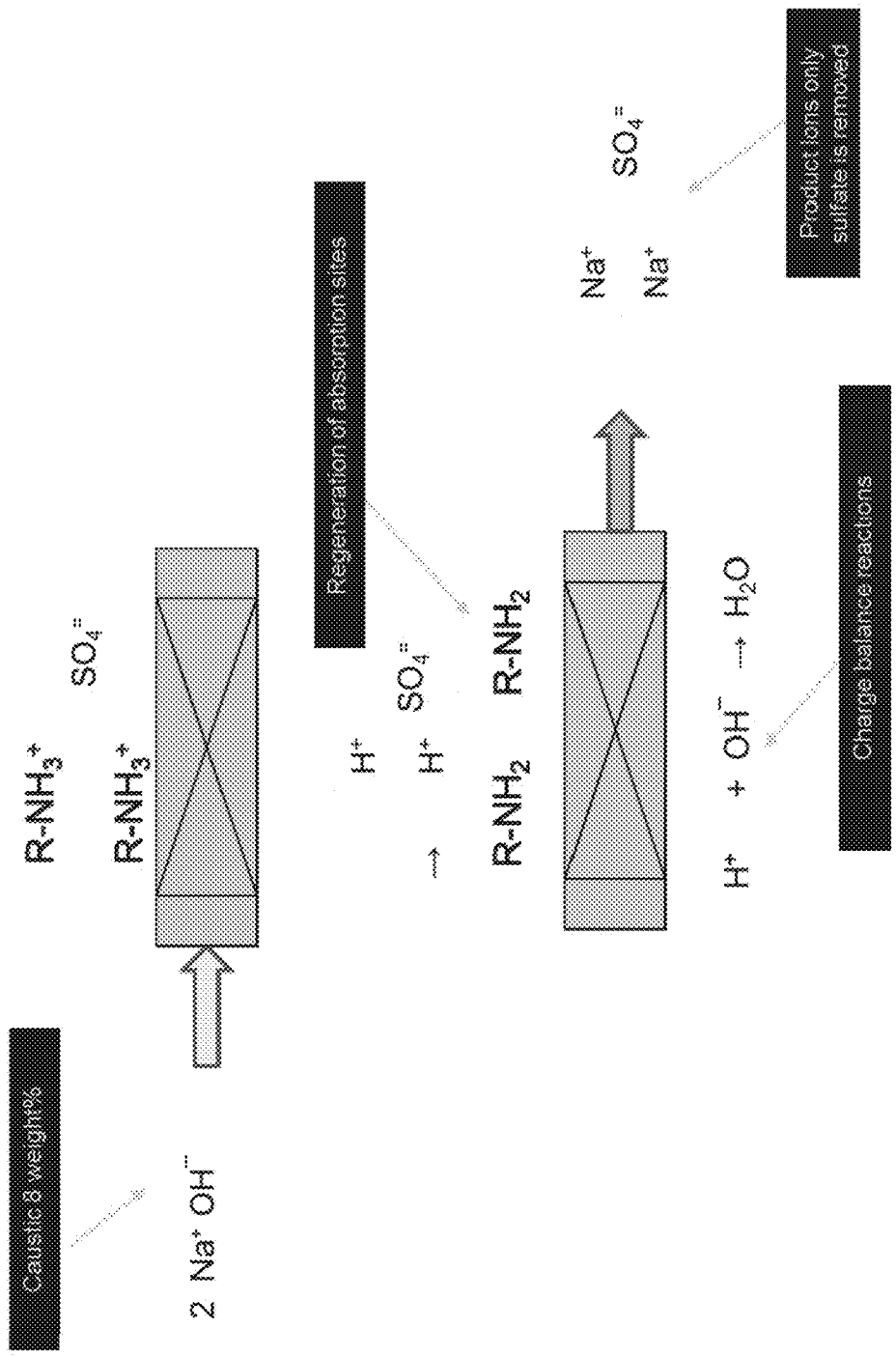
FIG. 9 shows the process scheme of the anion exchange during the regeneration step.

During regeneration, the ammonium ions in the resin are converted back to amine groups as shown in FIG. 9, so that the resin could be used in the next cycle. Only sodium sulfate is eluted from the system. It is of particular note that only the sulfate ion is removed from the system. The caustic added during the regeneration step is used in the formation of sodium sulfate. This is important for the process because regeneration only removes the sulfate from the system that is formed by the oxidation of sulfur dioxide.

Example 4

A demonstration facility including an anion exchange resin unit employing an A111 anion exchange resin was operated to treat a feed stream having the composition set forth in the table below. The following table also reports the results obtained when an A111 Purolite resin was used. Malate losses were very low with excellent resin utilization.

| Component | |
| --- | --- |
| Malic Acid, weight % | 3.4% |
| Sodium Sulfate, weight % | 1.3% |
| Malate losses, % | 0.2% |
| Malate/Sulfate losses, % | 1.5% |
| Sulfate removed/Volume of resin, g/ml | 0.08 |
| Resin utilization, % of reported | 98% |

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description and shown in the accompanying drawing[s] shall be interpreted as illustrative and not in a limiting sense.

What is claimed is:

1. A process for selectively removing and recovering sulfur dioxide from a sulfur dioxide-containing source gas, the process comprising:

contacting a feed gas stream comprising the source gas in a sulfur dioxide absorber with a buffered aqueous absorption medium comprising a salt of a polyprotic carboxylic acid, thereby absorbing sulfur dioxide from the feed gas stream into the absorption medium and producing an exhaust gas from which sulfur dioxide has been removed and a sulfur dioxide-enriched absorption liquor comprising aqueous absorption medium and sulfur dioxide absorbed therein;

heating the sulfur dioxide-enriched absorption liquor in an absorption liquor stripper to desorb sulfur dioxide from the sulfur dioxide-enriched absorption liquor and thereby produce a regenerated aqueous absorption medium and a sulfur dioxide-enriched stripper gas;

recirculating regenerated aqueous absorption medium to the sulfur dioxide absorber for further absorption of sulfur dioxide from further flow of the feed gas stream, wherein divalent sulfur oxyanion impurities accumulate in the aqueous absorption medium recirculated between the absorption liquor stripper and the sulfur dioxide absorber; and contacting an anion exchange feed stream comprising at least a portion of the aqueous absorption medium recirculated between the absorption liquor stripper and the sulfur dioxide absorber with an anion exchange resin, thereby selectively removing divalent sulfur oxyanion impurities from the anion exchange feed stream to produce a treated aqueous absorption medium from which impurities have been removed and an anion exchange resin charged with impurities removed from the anion exchange feed stream, wherein the anion exchange feed stream is acidified prior to contact with the anion exchange resin to convert at least a portion of the polyprotic carboxylic acid salt therein to the corresponding acid.

2. The process as set forth in claim 1 wherein the buffered aqueous absorption medium comprises a salt of a polyprotic carboxylic acid, the polyprotic carboxylic acid being able to undergo a plurality of dissociations each having a pKa value, wherein at least one of the pKa values is from about 3 to about 10 at 25° C., or from about 4 to about 7 at 25° C.

3. The process as set forth in claim 1 wherein the aqueous absorption medium comprises a metal salt of a polycarboxylic acid selected from the group consisting of citric acid, tartaric acid, malic acid and mixtures thereof.

4. The process as set forth in claim 3 wherein the aqueous absorption medium comprises a metal salt of malic acid.

5. The process as set forth in claim 4 wherein the aqueous absorption medium comprises sodium malate.

6. The process as set forth in claim 4 wherein the molar ratio of bimalate salt to malate salt in the buffered aqueous absorption medium fed to the absorber ranges from about 0.5 to about 2, or from about 0.7 to about 1.5.

7. The process as set forth in claim 1 wherein the anion exchange resin is a weak-base anion exchange resin.

8. The process as set forth in claim 1 wherein the divalent sulfur oxyanion impurities selectively removed by the anion exchange resin comprise sulfate ($SO_4^{2-}$) anions.

9. The process as set forth in claim 1 wherein the anion exchange feed stream is acidified by addition of an acidifying agent having a pKa value lower than the lowest pKa value of the polycarboxylic acid prior to contact with the anion exchange resin.

10. The process as set forth in claim 1 wherein the anion exchange feed stream is acidified by addition of an acidifying agent selected from the group consisting of sulfur dioxide, sulfuric acid, sulfurous acid, and combinations thereof prior to contact with the anion exchange resin.

11. The process as set forth in claim 10 wherein the acidifying agent comprises sulfurous acid.

12. The process as set forth in claim 1 wherein the anion exchange feed stream is acidified to a pH value such that at least about 50%, at least about 75%, or at least about 95% of the total amount of the polyprotic carboxylic acid absorbent present in the acidified anion exchange feed stream is converted to the acid form.

13. The process as set forth in claim 1 wherein the anion exchange feed stream is acidified to a pH less than about 4, less than about 3, less than about 2.8, or less than about 2.5, from about 1 to about 4, from about 1.5 to about 3, from about 2 to about 3, from about 2.1 to about 2.8, from about 2.1 to about 2.5, or from about 2.1 to about 2.3 prior to contact with the anion exchange resin.

14. The process as set forth in claim 1 wherein the charged anion exchange resin is regenerated by contacting the charged anion exchange resin with a strong base to remove divalent sulfur oxyanion impurities and produce a regenerated anion exchange resin and a waste stream comprising divalent sulfur oxyanion impurities.

15. The process as set forth in claim 1 wherein the charged anion exchange resin is regenerated by contacting the charged anion exchange resin with a caustic solution to remove divalent sulfur oxyanion impurities and produce a regenerated anion exchange resin and a waste stream comprising divalent sulfur oxyanion impurities.

16. The process as set forth in claim 14 wherein regeneration of the charged anion exchange resin comprises contacting the charged anion exchange resin with wash water before and/or after contacting the charged anion exchange with the strong base solution.

17. The process as set forth in claim 1 wherein the anion exchange feed stream comprises at least a portion of the sulfur dioxide-enriched absorption liquor removed from the sulfur dioxide absorber.

18. The process as set forth in claim 14 wherein the molar ratio of divalent sulfur oxyanion species to anions of the polyprotic carboxylic acid salt absorbent in the total effluent discharged during regeneration of the anion exchange resin is at least about 10:1, at least about 20:1, at least about 30:1, at least about 40:1, at least about 50:1, at least about 75:1, at least about 100:1, at least about 150:1, or at least about 200:1.

19. The process as set forth in claim 14 wherein the weight of divalent sulfur oxyanion species to the total weight of divalent sulfur oxyanion species and anions of the polyprotic carboxylic acid salt absorbent (water free basis) recovered during regeneration of the anion exchange resin is greater than about 90%, greater than about 95%, greater than about 97%, greater than about 98%, or greater than about 99%.

20. The process as set forth in claim 1 wherein the buffered aqueous absorption medium contacted with the feed gas stream further comprises an oxidation inhibitor.

21. The process as set forth in claim 20 wherein the oxidation inhibitor is selected from the group consisting of ascorbic acid, ethylenediaminetetraacetic acid, p-phenylenediamine, hydroquinone, glutathione, hydroquinone monoethyl ether, salts thereof, and mixtures thereof.

22. The process as set forth in claim 20 wherein the oxidation inhibitor is ascorbic acid or a salt thereof.

23. The process as set forth in claim 1 wherein the sulfur dioxide-enriched stripper gas comprises water vapor and the process further comprises:

withdrawing regenerated absorption medium from a liquid outlet of the absorption liquor stripper and a primary sulfur dioxide-enriched stripper gas effluent from a vapor outlet of the absorption liquor stripper;

condensing water from the primary sulfur dioxide-enriched stripper gas effluent by indirect transfer of heat from the primary sulfur dioxide-enriched stripper gas effluent to a cooling medium in a primary stripper gas cooler/condenser to thereby produce an aqueous sulfur dioxide-bearing condensate and a sulfur dioxide-containing vent gas; and combining at least a portion of the sulfur dioxide-enriched absorption liquor removed from the sulfur dioxide absorber with an acidifying agent selected from the group consisting of sulfurous acid and/or sulfur dioxide obtained from the aqueous sulfur dioxide-bearing condensate, the sulfur dioxide-containing vent gas, and combinations thereof to acidify the anion exchange feed stream.

24. The process as set forth in claim 23 further comprising contacting the aqueous sulfur dioxide-bearing condensate exiting the primary stripper gas cooler/condenser with steam in a condensate stripper to produce a stripped condensate and a condensate stripper gas effluent containing water vapor and sulfur dioxide; and condensing water from condensate stripper gas effluent by indirect transfer of heat from the condensate stripper gas effluent to a cooling medium in a secondary stripper gas cooler/condenser to thereby produce a second aqueous sulfur dioxide-bearing condensate and a sulfur dioxide-containing product stream;

wherein at least a portion of the sulfur dioxide-enriched absorption liquor removed from the sulfur dioxide absorber is combined with an acidifying agent selected from the group consisting of sulfurous acid obtained from the second aqueous sulfur dioxide-bearing condensate, sulfur dioxide obtained in the sulfur dioxide-containing product stream, and combinations thereof to acidify the anion exchange feed stream.

25. The process as set forth in claim 1, further comprising contacting the feed gas stream with water in a saturator upstream of the sulfur dioxide absorber with respect to feed gas flow, thereby increasing the humidity of the feed gas stream introduced into the sulfur dioxide absorber and producing an aqueous effluent comprising sulfurous acid exiting the saturator; and combining at least a portion of the sulfur dioxide-enriched absorption liquor removed from the sulfur dioxide absorber with at least a portion of the aqueous effluent exiting the saturator to acidify the anion exchange feed stream.

26. The process as set forth in claim 1 wherein the process further comprises:

contacting a cation exchange feed stream comprising at least a portion of the aqueous absorption medium recirculated between the absorption liquor stripper and the sulfur dioxide absorber with a cation exchange resin, thereby selectively removing metal ion impurities from the cation exchange feed stream to produce a treated aqueous medium from which metal impurities have been removed and a cation exchange resin charged with metal impurities removed from the cation exchange feed stream.

\* \* \* \* \*